United States Patent
Fischer et al.

(10) Patent No.: US 8,885,535 B2
(45) Date of Patent: Nov. 11, 2014

(54) MANAGEMENT FRAME MAP DIRECTED OPERATIONAL PARAMETERS WITHIN MULTIPLE USER, MULTIPLE ACCESS, AND/OR MIMO WIRELESS COMMUNICATIONS

(75) Inventors: Matthew James Fischer, Mountain View, CA (US); Vinko Erceg, Cardiff by the Sea, CA (US); Joonsuk Kim, Saratoga, CA (US); Joseph Paul Lauer, North Reading, MA (US); Peiman Amini, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 574 days.

(21) Appl. No.: 12/852,435

(22) Filed: Aug. 6, 2010

(65) Prior Publication Data
US 2011/0013616 A1 Jan. 20, 2011

Related U.S. Application Data

(63) Continuation-in-part of application No. 12/796,655, filed on Jun. 8, 2010, and a continuation-in-part of (Continued)

(51) Int. Cl.
| | |
|---|---|
| H04W 74/00 | (2009.01) |
| H04B 7/06 | (2006.01) |
| H04L 1/06 | (2006.01) |
| H04L 1/00 | (2006.01) |
| H04W 72/04 | (2009.01) |
| H04L 5/00 | (2006.01) |
| H04B 7/04 | (2006.01) |

(52) U.S. Cl.
CPC ............ H04B 7/0669 (2013.01); *H04L 1/0003* (2013.01); *H04W 72/042* (2013.01); *H04L 5/0007* (2013.01); *H04L 1/0065* (2013.01); H04L 1/0031 (2013.01); *H04L 1/0009* (2013.01); *H04L 1/0637* (2013.01); *H04B 7/0452* (2013.01)

USPC .................... 370/312; 370/328; 370/344

(58) Field of Classification Search
None
See application file for complete search history.

(56) References Cited

U.S. PATENT DOCUMENTS

| | | |
|---|---|---|
| 7,062,703 B1 | 6/2006 | Keaney |
| 7,257,095 B2 | 8/2007 | Liu |

(Continued)

OTHER PUBLICATIONS

European Search Report for EP Application No./Patent No. 11001048.5-2411, dated Jun. 1, 2011, 7 pages.

*Primary Examiner* — Robert C Scheibel
(74) *Attorney, Agent, or Firm* — Garlick & Markison; Kevin L. Smith

(57) ABSTRACT

Management frame map directed operational parameters within multiple user, multiple access, and/or MIMO wireless communications. A management frame map may be generated within and transmitted from a first wireless communication device to a number of other wireless communication devices. Thereafter, certain subsequently transmitted packets may be analyzed and processed by the receiving wireless communication devices based on that earlier received management frame map. One or more operational parameters are determined for a subsequently transmitted packet based on the previously received management frame map; such operational parameters then govern the manner in which at least a portion of the subsequently transmitted packet is processed. Some examples of such operational parameters include a cluster on which a least a portion of the packet is transmitted, a modulation coding scheme (MCS), a forward error correction (FEC) coding scheme, space time block coding (STBC), an antenna configuration within the wireless communication device, etc.

28 Claims, 22 Drawing Sheets

Related U.S. Application Data application No. 12/794,707, filed on Jun. 4, 2010, said application No. 12/796,655 is a continuation-in-part of application No. 12/794,711, filed on Jun. 4, 2010, now Pat. No. 8,498,359.

(60) Provisional application No. 61/232,316, filed on Aug. 7, 2009, provisional application No. 61/240,285, filed on Sep. 7, 2009, provisional application No. 61/250,531, filed on Oct. 11, 2009, provisional application No. 61/255,232, filed on Oct. 27, 2009, provisional application No. 61/319,366, filed on Mar. 31, 2010, provisional application No. 61/185,153, filed on Jun. 8, 2009, provisional application No. 61/185,161, filed on Jun. 8, 2009, provisional application No. 61/186,119, filed on Jun. 11, 2009, provisional application No. 61/311,480, filed on Mar. 8, 2010, provisional application No. 61/250,491, filed on Oct. 9, 2009, provisional application No. 61/255,690, filed on Oct. 28, 2009, provisional application No. 61/257,323, filed on Nov. 2, 2009, provisional application No. 61/321,430, filed on Apr. 6, 2010, provisional application No. 61/184,420, filed on Jun. 5, 2009.

(56) References Cited

U.S. PATENT DOCUMENTS

| | | | |
|---|---|---|---|
| 7,369,487 B2 * | 5/2008 | Li et al. | 370/210 |
| 7,620,067 B2 * | 11/2009 | Niu et al. | 370/465 |
| 8,102,786 B2 * | 1/2012 | Dang | 370/310 |
| 2003/0177267 A1 | 9/2003 | Orava | |
| 2005/0025080 A1 | 2/2005 | Liu | |
| 2008/0181156 A1 | 7/2008 | Ecclesine | |
| 2008/0186890 A1 | 8/2008 | Shao | |
| 2008/0232490 A1 | 9/2008 | Gross | |
| 2009/0040970 A1 * | 2/2009 | Ahmadi et al. | 370/329 |

* cited by examiner

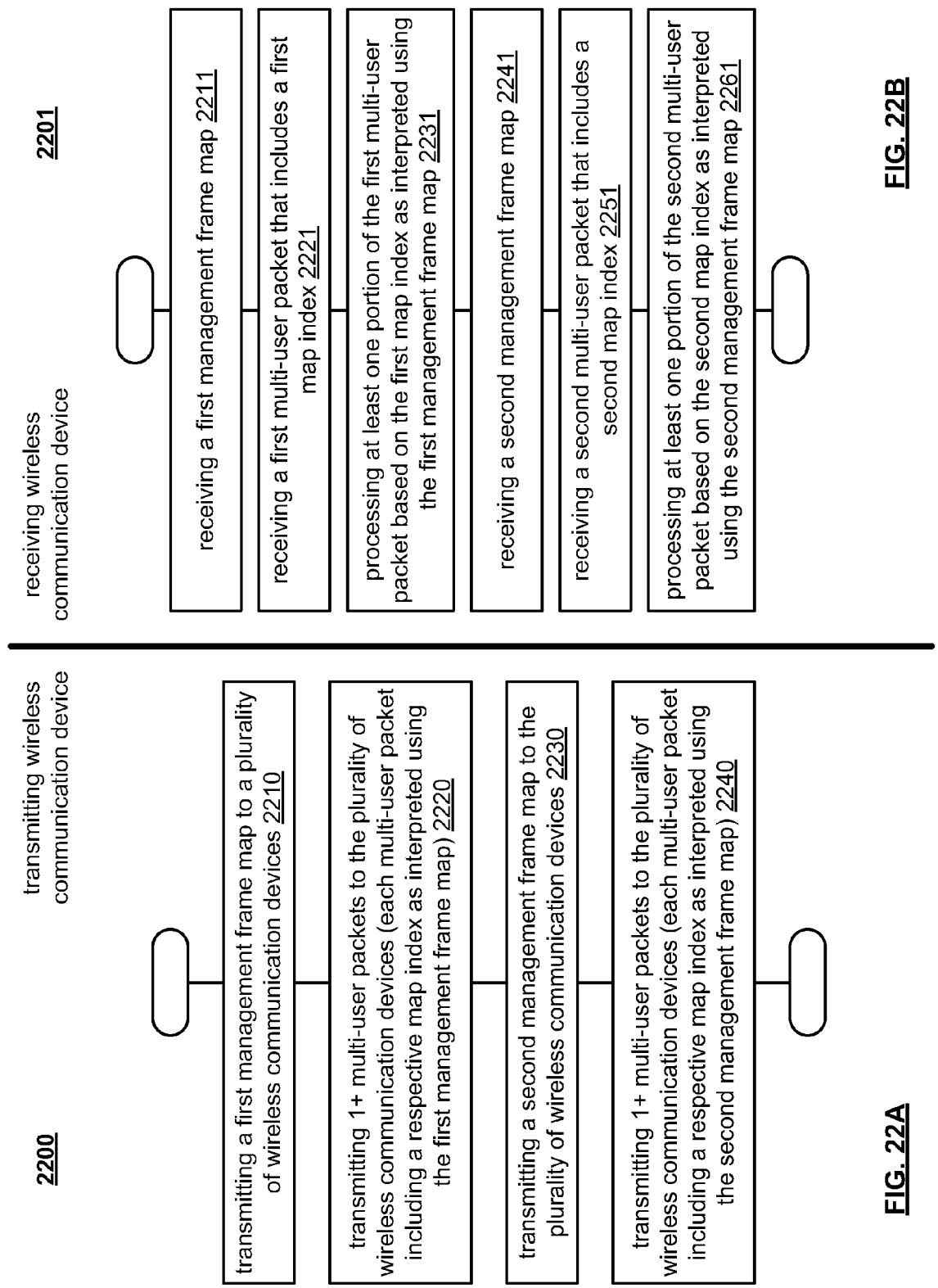

MANAGEMENT FRAME MAP DIRECTED OPERATIONAL PARAMETERS WITHIN MULTIPLE USER, MULTIPLE ACCESS, AND/OR MIMO WIRELESS COMMUNICATIONS

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Application Ser. No. 61/232,316, entitled "WLAN next generation PHY header options," filed Aug. 7, 2009.
2. U.S. Provisional Application Ser. No. 61/240,285, entitled "WLAN next generation PHY header options," filed Sep. 7, 2009.
3. U.S. Provisional Application Ser. No. 61/250,531, entitled "WLAN next generation PHY header options," filed Oct. 11, 2009.
4. U.S. Provisional Application Ser. No. 61/255,232, entitled "WLAN next generation PHY header options," filed Oct. 27, 2009.
5. U.S. Provisional Application Ser. No. 61/319,366, entitled "Efficient group ID for MU-MIMO transmissions in next generation WLAN," filed Mar. 31, 2010.

Continuation-in-Part (CIP) Priority Claims, 35 U.S.C. §120

The present U.S. Utility Patent Application claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

1. U.S. Utility Patent Application Ser. No. 12/796,655, entitled "Group identification and definition within multiple user, multiple access, and/or MIMO wireless communications," filed on Jun. 8, 2010, pending, which claims priority pursuant to 35 U.S.C. §119(e) to the following U.S. Provisional Patent Applications which are hereby incorporated herein by reference in their entirety and made part of the present U.S. Utility Patent Application for all purposes:
    1.1. U.S. Provisional Application Ser. No. 61/185,153, entitled "OFDMA cluster parsing and acknowledgement to OFDMA/MU-MIMO transmissions in WLAN device," filed Jun. 8, 2009.
    1.2. U.S. Provisional Application Ser. No. 61/185,161, entitled "WLAN Multi-user/OFDM multiple access training," filed Jun. 8, 2009.
    1.3. U.S. Provisional Application Ser. No. 61/186,119, entitled "WLAN Multi-user/OFDM multiple access training," filed Jun. 11, 2009.
    1.4. U.S. Provisional Application Ser. No. 61/311,480, entitled "Next generation WLAN backwards compatible sounding frame," filed Mar. 8, 2010.
    1.5. U.S. Provisional Application Ser. No. 61/250,491, entitled "Multi-user multiple input multiple output preamble," filed Oct. 9, 2009.
    1.6. U.S. Provisional Application Ser. No. 61/255,690, entitled "Multi-user multiple input multiple output preamble," filed Oct. 28, 2009.
    1.7. U.S. Provisional Application Ser. No. 61/257,323, entitled "Multi-user multiple input multiple output preamble," filed Nov. 2, 2009.
    1.8. U.S. Provisional Application Ser. No. 61/321,430, entitled "Multi-user multiple input multiple output preamble," filed Apr. 6, 2010.
    1.9. U.S. Provisional Application Ser. No. 61/232,316, entitled "WLAN next generation PHY header options," filed Aug. 7, 2009.
    1.10. U.S. Provisional Application Ser. No. 61/240,285, entitled "WLAN next generation PHY header options," filed Sep. 7, 2009.
    1.11. U.S. Provisional Application Ser. No. 61/250,531, entitled "WLAN next generation PHY header options," filed Oct. 11, 2009.
    1.12. U.S. Provisional Application Ser. No. 61/255,232, entitled "WLAN next generation PHY header options," filed Oct. 27, 2009.
    1.13. U.S. Provisional Application Ser. No. 61/319,366, entitled "Efficient group ID for MU-MIMO transmissions in next generation WLAN," filed Mar. 31, 2010.

The U.S. Utility patent application Ser. No. 12/796,655, entitled "Group identification and definition within multiple user, multiple access, and/or MIMO wireless communications," filed on Jun. 8, 2010, pending, also claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

2. U.S. Utility Patent Application Ser. No. 12/794,707, entitled "Cluster parsing for signaling within multiple user, multiple access, and/or MIMO wireless communications," filed on Jun. 4, 2010, pending, which claims priority pursuant to 35 U.S.C. §119(e) to the following U.S. Provisional Patent Applications which are hereby incorporated herein by reference in their entirety and made part of the present U.S. Utility Patent Application for all purposes:
    2.1. U.S. Provisional Application Ser. No. 61/184,420, entitled "OFDMA cluster parsing and acknowledgement to OFDMA/MU-MIMO transmissions in WLAN device," filed Jun. 5, 2009.
    2.2. U.S. Provisional Application Ser. No. 61/185,153, entitled "OFDMA cluster parsing and acknowledgement to OFDMA/MU-MIMO transmissions in WLAN device," filed Jun. 8, 2009.

The U.S. Utility patent application Ser. No. 12/796,655, entitled "Group identification and definition within multiple user, multiple access, and/or MIMO wireless communications," filed on Jun. 8, 2010, pending, also claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

3. U.S. Utility Patent Application Ser. No. 12/794,711, entitled "Transmission acknowledgement within multiple user, multiple access, and/or MIMO wireless communications," filed on Jun. 4, 2010, pending, which claims priority pursuant to 35 U.S.C. §119(e) to the following U.S. Provisional Patent Applications which are hereby incorporated herein by reference in their entirety and made part of the present U.S. Utility Patent Application for all purposes:

3.1. U.S. Provisional Application Ser. No. 61/184,420, entitled "OFDMA cluster parsing and acknowledgement to OFDMA/MU-MIMO transmissions in WLAN device," filed Jun. 5, 2009.

3.2. U.S. Provisional Application Ser. No. 61/185,153, entitled "OFDMA cluster parsing and acknowledgement to OFDMA/MU-MIMO transmissions in WLAN device," filed Jun. 8, 2009.

Incorporation by Reference

The following U.S. Utility Patent Application is hereby incorporated herein by reference in its entirety and is made part of the present U.S. Utility Patent Application for all purposes:

1. U.S. Utility patent application Ser. No. 12/796,654, entitled "Channel characterization and training within multiple user, multiple access, and/or MIMO wireless communications," filed on Jun. 8, 2010, pending.

The following IEEE standard is hereby incorporated herein by reference in its entirety and is made part of the present U.S. Utility Patent Application for all purposes:

1. IEEE 802.11—2007, "IEEE Standard for Information technology—Telecommunications and information exchange between systems—Local and metropolitan area networks—Specific requirements; Part 11: Wireless LAN Medium Access Control (MAC) and Physical Layer (PHY) Specifications," IEEE Computer Society, IEEE Std 802.11™-2007, (Revision of IEEE Std 802.11-1999), 1232 pages.

BACKGROUND OF THE INVENTION

1. Technical Field of the Invention

The invention relates generally to communication systems; and, more particularly, it relates to implementations of management frame map directed operational parameters within multiple user, multiple access, and/or MIMO wireless communications.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

Typically, the transmitter will include one antenna for transmitting the RF signals, which are received by a single antenna, or multiple antennae (alternatively, antennas), of a receiver. When the receiver includes two or more antennae, the receiver will select one of them to receive the incoming RF signals. In this instance, the wireless communication between the transmitter and receiver is a single-output-single-input (SISO) communication, even if the receiver includes multiple antennae that are used as diversity antennae (i.e., selecting one of them to receive the incoming RF signals). For SISO wireless communications, a transceiver includes one transmitter and one receiver. Currently, most wireless local area networks (WLAN) that are IEEE 802.11, 802.11a, 802.11b, or 802.11g employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennae and two or more receiver paths. Each of the antennae receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennae to a receiver. The receiver includes a single receiver path that receives the multiple RF signals from the transmitter. In this instance, the receiver uses beam forming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

With the various types of wireless communications (e.g., SISO, MISO, SIMO, and MIMO), it would be desirable to use one or more types of wireless communications to enhance data throughput within a WLAN. For example, high data rates can be achieved with MIMO communications in comparison to SISO communications. However, most WLAN include legacy wireless communication devices (i.e., devices that are compliant with an older version of a wireless communication standard). As such, a transmitter capable of MIMO wireless communications should also be backward compatible with legacy devices to function in a majority of existing WLANs.

Therefore, a need exists for a WLAN device that is capable of high data throughput and is backward compatible with legacy devices.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

FIG. 19A, FIG. 19B, FIG. 20A, FIG. 20B, FIG. 21, FIG. 22A, and FIG. 22B are diagrams illustrating various embodiments of methods for operating one or more wireless communication devices.

DETAILED DESCRIPTION OF THE INVENTION

Figure 1:
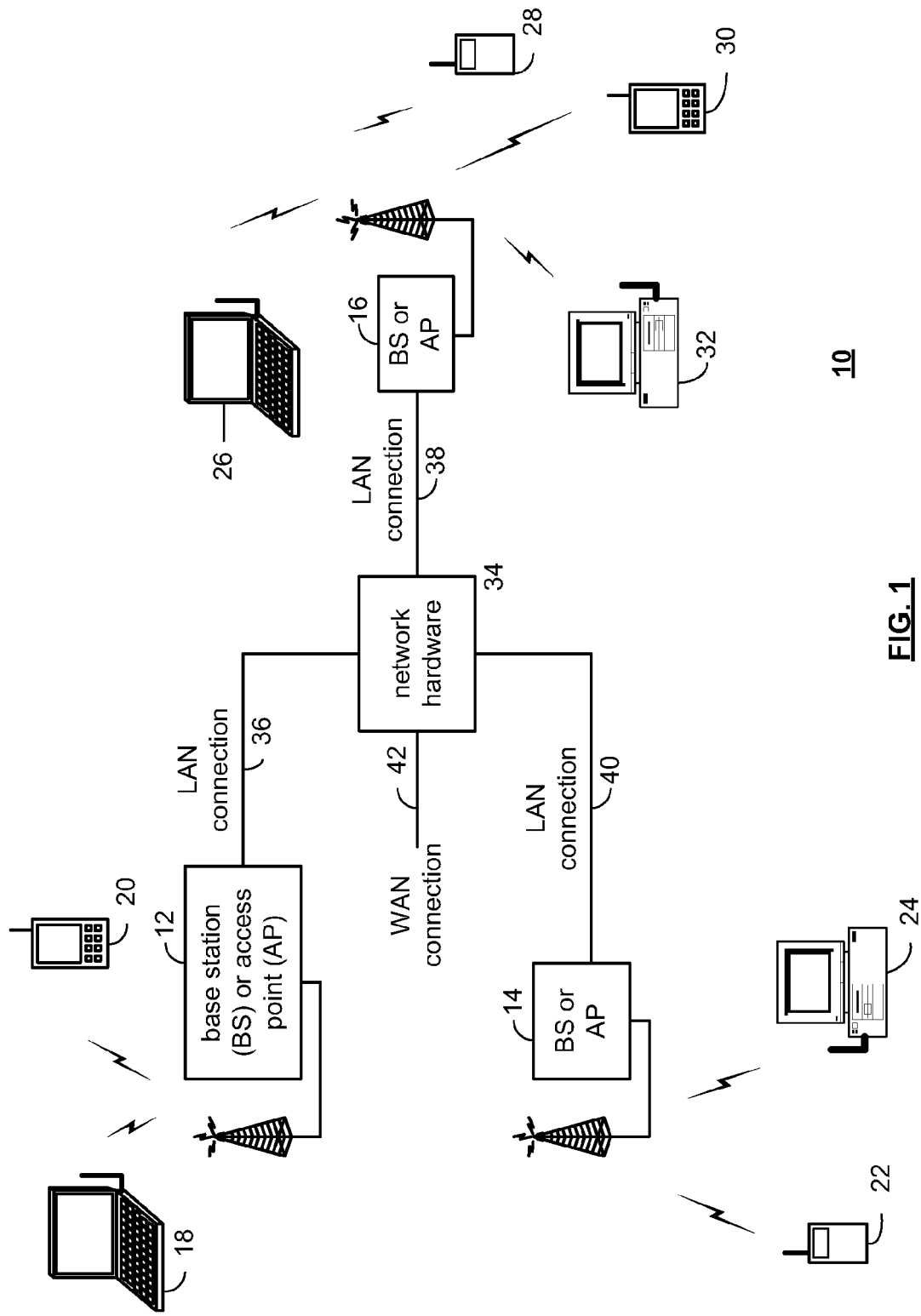
FIG. 1 is a diagram illustrating an embodiment of a wireless communication system.

FIG. 1 is a diagram illustrating an embodiment of a wireless communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of an embodiment of such wireless communication devices is described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel.

Typically, base stations are used for cellular telephone systems (e.g., advanced mobile phone services (AMPS), digital AMPS, global system for mobile communications (GSM), code division multiple access (CDMA), local multi-point distribution systems (LMDS), multi-channel-multi-point distribution systems (MMDS), Enhanced Data rates for GSM Evolution (EDGE), General Packet Radio Service (GPRS), high-speed downlink packet access (HSDPA), high-speed uplink packet access (HSUPA and/or variations thereof) and like-type systems, while access points are used for in-home or in-building wireless networks (e.g., IEEE 802.11, Bluetooth, ZigBee, any other type of radio frequency based network protocol and/or variations thereof). Regardless of the particular type of communication system, each wireless communication device includes a built-in radio and/or is coupled to a radio. Such wireless communication devices may operate in accordance with the various aspects of the invention as presented herein to enhance performance, reduce costs, reduce size, and/or enhance broadband applications.

Figure 2:
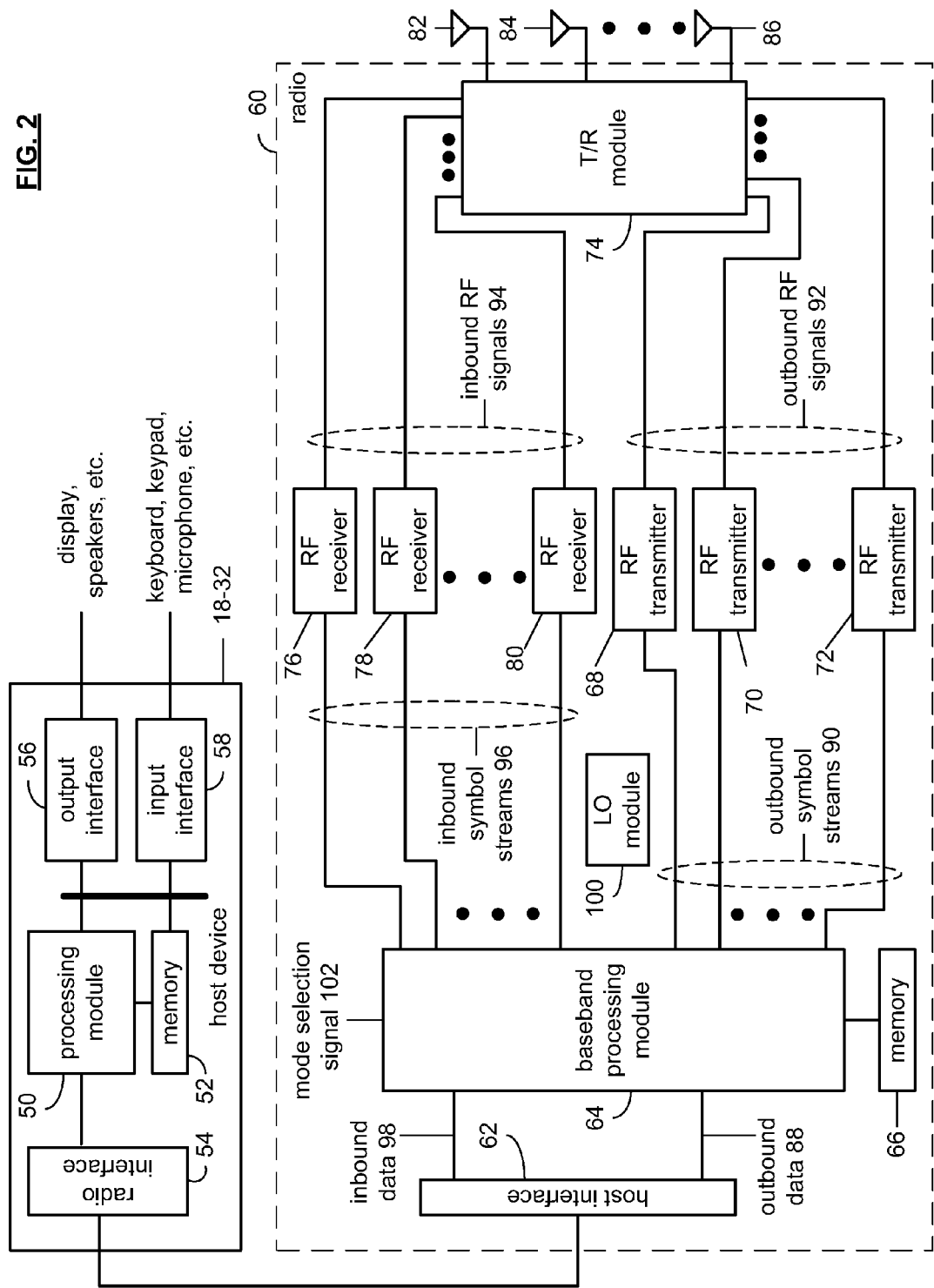
FIG. 2 is a diagram illustrating an embodiment of a wireless communication device.

FIG. 2 is a diagram illustrating an embodiment of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 64, memory 66, a plurality of radio frequency (RF) transmitters 68-72, a transmit/receive (T/R) module 74, a plurality of antennae 82-86, a plurality of RF receivers 76-80, and a local oscillation module 100. The baseband processing module 64, in combination with operational instructions stored in memory 66, execute digital receiver functions and digital transmitter functions, respectively. The digital receiver functions, as will be described in greater detail with reference to FIG. 11B, include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse fast Fourier transform, cyclic prefix addition, space and time encoding, and/or digital baseband to IF conversion. The baseband processing modules 64 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 66 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 88 from the host device via the host interface 62. The baseband processing module 64 receives the outbound data 88 and, based on a mode selection signal 102, produces one or more outbound symbol streams 90. The mode selection signal 102 will indicate a particular mode as are illustrated in the mode selection tables, which appear at the end of the detailed discussion. For example, the mode selection signal 102, with reference to table 1 may indicate a frequency band of 2.4 GHz or 5 GHz, a channel bandwidth of 20 or 22 MHz (e.g., channels of 20 or 22 MHz width) and a maximum bit rate of 54 megabits-per-second. In other embodiments, the channel bandwidth may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. As is further illustrated in table 1, a code rate is supplied as well as number of coded bits per subcarrier (NBPSC), coded bits per OFDM symbol (NCBPS), data bits per OFDM symbol (NDBPS).

The mode selection signal may also indicate a particular channelization for the corresponding mode which for the information in table 1 is illustrated in table 2. As shown, table 2 includes a channel number and corresponding center frequency. The mode select signal may further indicate a power spectral density mask value which for table 1 is illustrated in table 3. The mode select signal may alternatively indicate rates within table 4 that has a 5 GHz frequency band, 20 MHz channel bandwidth and a maximum bit rate of 54 megabits-per-second. If this is the particular mode select, the channelization is illustrated in table 5. As a further alternative, the mode select signal 102 may indicate a 2.4 GHz frequency band, 20 MHz channels and a maximum bit rate of 192 megabits-per-second as illustrated in table 6. In table 6, a number of antennae may be utilized to achieve the higher bit rates. In this instance, the mode select would further indicate the number of antennae to be utilized. Table 7 illustrates the channelization for the set-up of table 6. Table 8 illustrates yet another mode option where the frequency band is 2.4 GHz, the channel bandwidth is 20 MHz and the maximum bit rate is 192 megabits-per-second. The corresponding table 8 includes various bit rates ranging from 12 megabits-per-second to 216 megabits-per-second utilizing 2-4 antennae and a spatial time encoding rate as indicated. Table 9 illustrates the channelization for table 8. The mode select signal 102 may further indicate a particular operating mode as illustrated in table 10, which corresponds to a 5 GHz frequency band having 40 MHz frequency band having 40 MHz channels and a maximum bit rate of 486 megabits-per-second. As shown in table 10, the bit rate may range from 13.5 megabits-per-second to 486 megabits-per-second utilizing 1-4 antennae and a corresponding spatial time code rate. Table 10 further illustrates a particular modulation scheme code rate and NBPSC values. Table 11 provides the power spectral density mask for table 10 and table 12 provides the channelization for table 10.

It is of course noted that other types of channels, having different bandwidths, may be employed in other embodiments without departing from the scope and spirit of the invention. For example, various other channels such as those having 80 MHz, 120 MHz, and/or 160 MHz of bandwidth may alternatively be employed such as in accordance with IEEE Task Group ac (TGac VHTL6).

The baseband processing module 64, based on the mode selection signal 102 produces the one or more outbound symbol streams 90, as will be further described with reference to FIGS. 5-9 from the output data 88. For example, if the mode selection signal 102 indicates that a single transmit antenna is being utilized for the particular mode that has been selected, the baseband processing module 64 will produce a single outbound symbol stream 90. Alternatively, if the mode select signal indicates 2, 3 or 4 antennae, the baseband processing module 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The implementation of the RF transmitters 68-72 will be further described with reference to FIG. 3. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80, which will be described in greater detail with reference to FIG. 4, converts the inbound RF signals 94 into a corresponding number of inbound symbol streams 96. The number of inbound symbol streams 96 will correspond to the particular mode in which the data was received (recall that the mode may be any one of the modes illustrated in tables 1-12). The baseband processing module 64 receives the inbound symbol streams 90 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) in accordance with a WLAN protocol. The Physical Layer Convergence Procedure (PLCP) Module, which may be implemented in the processing module 64, is operably coupled to convert the MPDU into a PLCP Protocol Data Unit (PPDU) in accordance with the WLAN protocol. The Physical Medium Dependent (PMD) module is operably coupled to convert the PPDU into a plurality of radio frequency (RF) signals in accordance with one of a plurality of operating modes of the WLAN protocol, wherein the plurality of operating modes includes multiple input and multiple output combinations.

An embodiment of the Physical Medium Dependent (PMD) module, which will be described in greater detail with reference to FIGS. 10A and 10B, includes an error protection module, a demultiplexing module, and a plurality of direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into a plurality of error protected data streams The plurality of direct conversion modules is operably coupled to convert the plurality of error protected data streams into a plurality of radio frequency (RF) signals.

As one of average skill in the art will appreciate, the wireless communication device of FIG. 2 may be implemented using one or more integrated circuits. For example, the host device may be implemented on one integrated circuit, the baseband processing module 64 and memory 66 may be implemented on a second integrated circuit, and the remaining components of the radio 60, less the antennae 82-86, may be implemented on a third integrated circuit. As an alternate example, the radio 60 may be implemented on a single integrated circuit. As yet another example, the processing module 50 of the host device and the baseband processing module 64 may be a common processing device implemented on a single integrated circuit. Further, the memory 52 and memory 66 may be implemented on a single integrated circuit and/or on the same integrated circuit as the common processing modules of processing module 50 and the baseband processing module 64.

Figure 3:
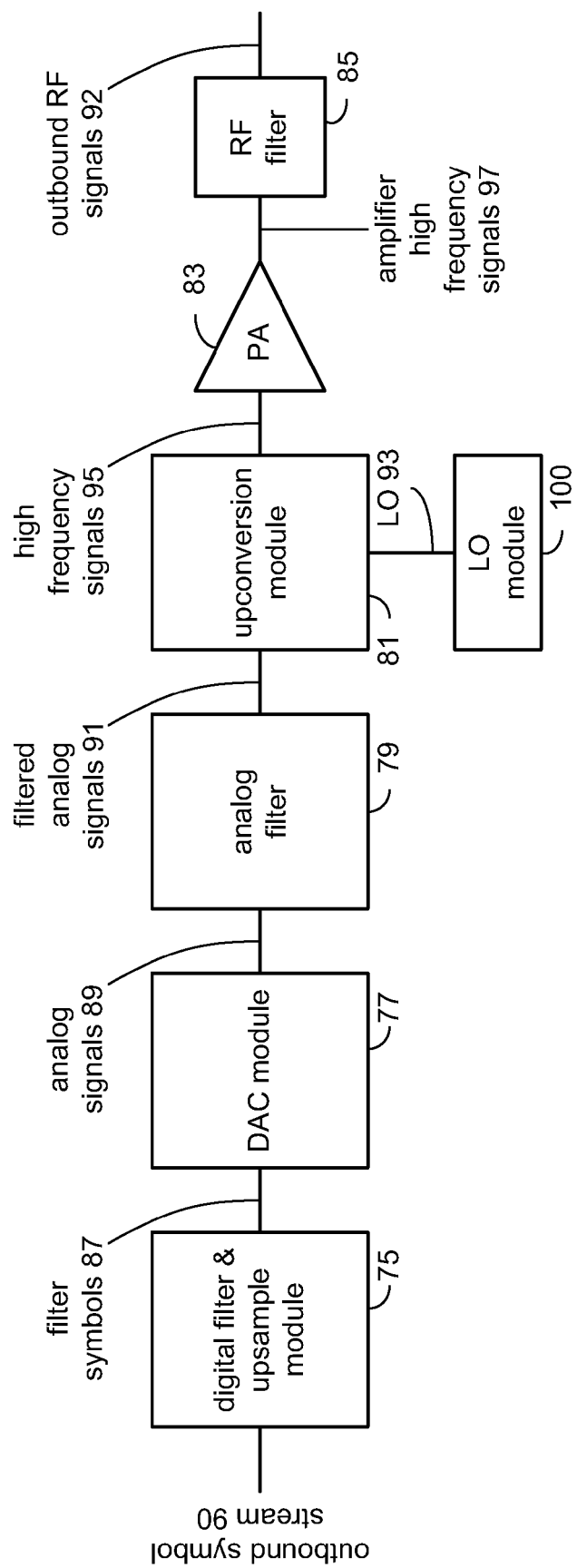
FIG. 3 is a diagram illustrating an embodiment of a radio frequency (RF) transmitter.

FIG. 3 is a diagram illustrating an embodiment of a radio frequency (RF) transmitter 68-72, or RF front-end, of the WLAN transmitter. The RF transmitter 68-72 includes a digital filter and up-sampling module 75, a digital-to-analog conversion module 77, an analog filter 79, and up-conversion module 81, a power amplifier 83 and a RF filter 85. The digital filter and up-sampling module 75 receives one of the outbound symbol streams 90 and digitally filters it and then up-samples the rate of the symbol streams to a desired rate to produce the filtered symbol streams 87. The digital-to-analog conversion module 77 converts the filtered symbols 87 into analog signals 89. The analog signals may include an in-phase component and a quadrature component.

The analog filter 79 filters the analog signals 89 to produce filtered analog signals 91. The up-conversion module 81, which may include a pair of mixers and a filter, mixes the filtered analog signals 91 with a local oscillation 93, which is produced by local oscillation module 100, to produce high frequency signals 95. The frequency of the high frequency signals 95 corresponds to the frequency of the outbound RF signals 92.

The power amplifier 83 amplifies the high frequency signals 95 to produce amplified high frequency signals 97. The RF filter 85, which may be a high frequency band-pass filter, filters the amplified high frequency signals 97 to produce the desired output RF signals 92.

As one of average skill in the art will appreciate, each of the radio frequency transmitters 68-72 will include a similar architecture as illustrated in FIG. 3 and further include a shut-down mechanism such that when the particular radio frequency transmitter is not required, it is disabled in such a manner that it does not produce interfering signals and/or noise.

Figure 4:
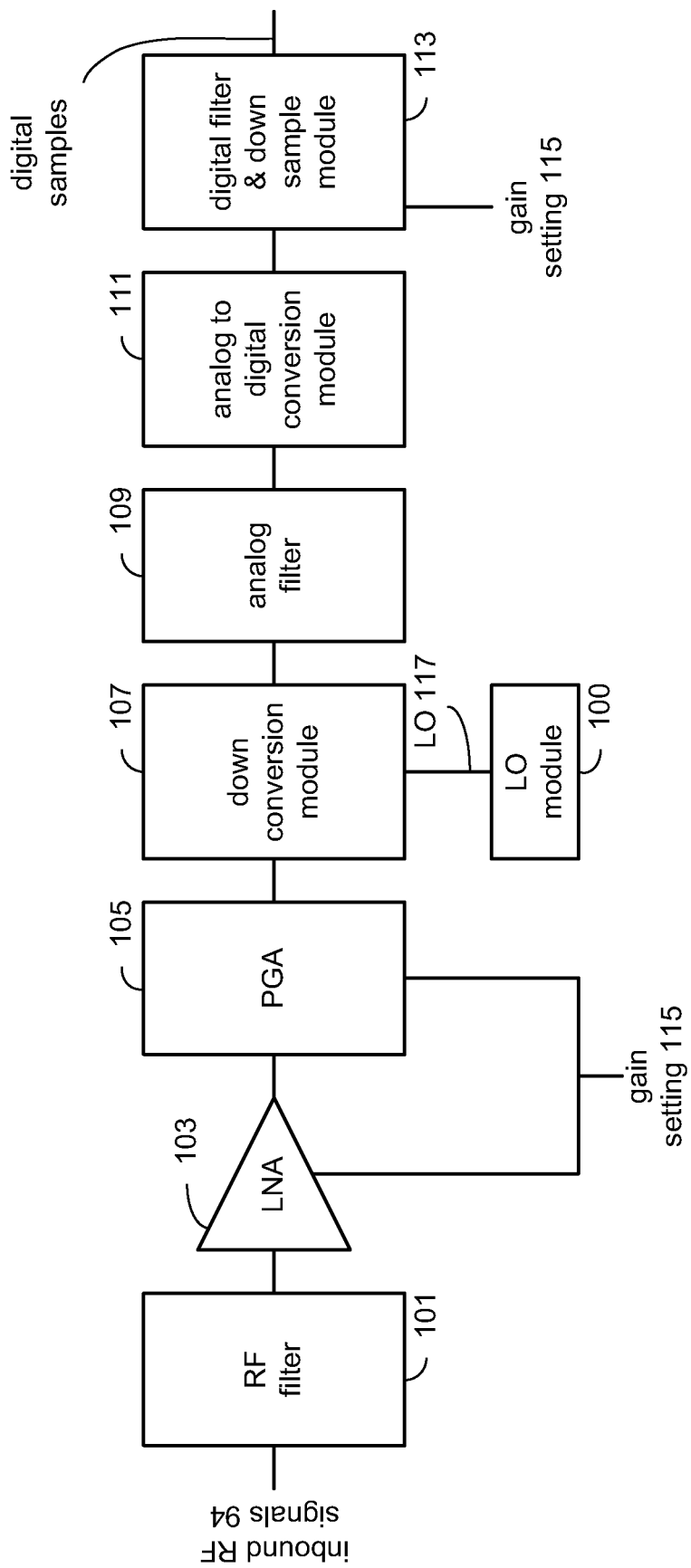
FIG. 4 is a diagram illustrating an embodiment of an RF receiver.

FIG. 4 is a diagram illustrating an embodiment of an RF receiver. This may depict any one of the RF receivers 76-80. In this embodiment, each of the RF receivers 76-80 includes an RF filter 101, a low noise amplifier (LNA) 103, a programmable gain amplifier (PGA) 105, a down-conversion module 107, an analog filter 109, an analog-to-digital conversion module 111 and a digital filter and down-sampling module 113. The RF filter 101, which may be a high frequency band-pass filter, receives the inbound RF signals 94 and filters them to produce filtered inbound RF signals. The low noise amplifier 103 amplifies the filtered inbound RF signals 94 based on a gain setting and provides the amplified signals to the programmable gain amplifier 105. The programmable gain amplifier further amplifies the inbound RF signals 94 before providing them to the down-conversion module 107.

The down-conversion module 107 includes a pair of mixers, a summation module, and a filter to mix the inbound RF signals with a local oscillation (LO) that is provided by the local oscillation module to produce analog baseband signals. The analog filter 109 filters the analog baseband signals and provides them to the analog-to-digital conversion module 111 which converts them into a digital signal. The digital filter and down-sampling module 113 filters the digital signals and then adjusts the sampling rate to produce the digital samples (corresponding to the inbound symbol streams 96).

Figure 5:
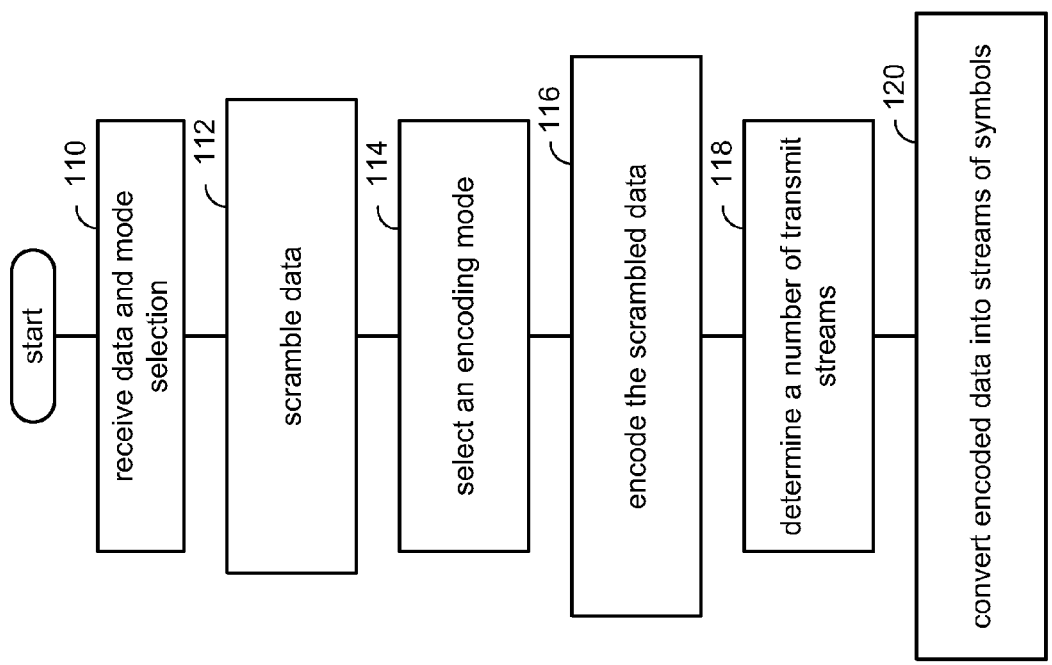
FIG. 5 is a diagram illustrating an embodiment of a method for baseband processing of data.

FIG. 5 is a diagram illustrating an embodiment of a method for baseband processing of data. This diagram shows a method for converting outbound data 88 into one or more outbound symbol streams 90 by the baseband processing module 64. The process begins at Step 110 where the baseband processing module receives the outbound data 88 and a mode selection signal 102. The mode selection signal may indicate any one of the various modes of operation as indicated in tables 1-12. The process then proceeds to Step 112 where the baseband processing module scrambles the data in accordance with a pseudo random sequence to produce scrambled data. Note that the pseudo random sequence may be generated from a feedback shift register with the generator polynomial of $S(x)=x^7+x^4+1$.

The process then proceeds to Step 114 where the baseband processing module selects one of a plurality of encoding modes based on the mode selection signal. The process then proceeds to Step 116 where the baseband processing module encodes the scrambled data in accordance with a selected encoding mode to produce encoded data. The encoding may be done utilizing any one or more a variety of coding schemes (e.g., convolutional coding, Reed-Solomon (RS) coding, turbo coding, turbo trellis coded modulation (TTCM) coding, LDPC (Low Density Parity Check) coding, etc.).

The process then proceeds to Step 118 where the baseband processing module determines a number of transmit streams based on the mode select signal. For example, the mode select signal will select a particular mode which indicates that 1, 2, 3, 4 or more antennae may be utilized for the transmission. Accordingly, the number of transmit streams will correspond to the number of antennae indicated by the mode select signal. The process then proceeds to Step 120 where the baseband processing module converts the encoded data into streams of symbols in accordance with the number of transmit streams in the mode select signal. This step will be described in greater detail with reference to FIG. 6.

Figure 6:
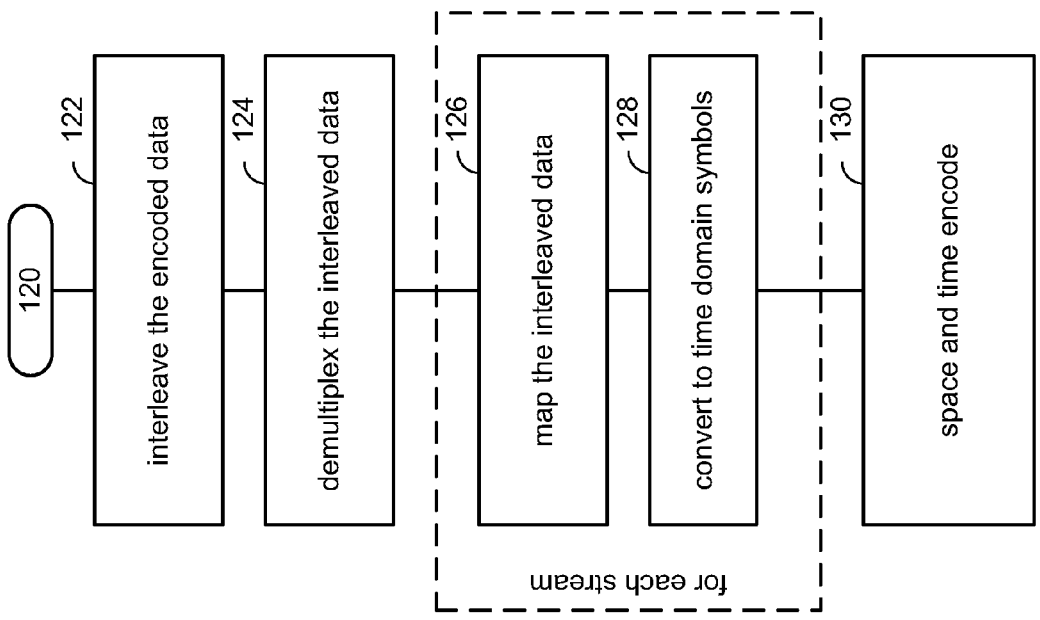
FIG. 6 is a diagram illustrating an embodiment of a method that further defines Step 120 of FIG. 5.

FIG. 6 is a diagram illustrating an embodiment of a method that further defines Step 120 of FIG. 5. This diagram shows a method performed by the baseband processing module to convert the encoded data into streams of symbols in accordance with the number of transmit streams and the mode select signal. Such processing begins at Step 122 where the baseband processing module interleaves the encoded data over multiple symbols and subcarriers of a channel to produce interleaved data. In general, the interleaving process is designed to spread the encoded data over multiple symbols and transmit streams. This allows improved detection and error correction capability at the receiver. In one embodiment, the interleaving process will follow the IEEE 802.11(a) or (g) standard for backward compatible modes. For higher performance modes (e.g., IEEE 802.11(n), the interleaving will also be done over multiple transmit paths or streams.

The process then proceeds to Step 124 where the baseband processing module demultiplexes the interleaved data into a number of parallel streams of interleaved data. The number of parallel streams corresponds to the number of transmit streams, which in turn corresponds to the number of antennae indicated by the particular mode being utilized. The process then continues to Steps 126 and 128, where for each of the parallel streams of interleaved data, the baseband processing module maps the interleaved data into a quadrature amplitude modulated (QAM) symbol to produce frequency domain symbols at Step 126. At Step 128, the baseband processing module converts the frequency domain symbols into time domain symbols, which may be done utilizing an inverse fast Fourier transform. The conversion of the frequency domain symbols into the time domain symbols may further include adding a cyclic prefix to allow removal of intersymbol interference at the receiver. Note that the length of the inverse fast Fourier transform and cyclic prefix are defined in the mode tables of tables 1-12. In general, a 64-point inverse fast Fourier transform is employed for 20 MHz channels and 128-point inverse fast Fourier transform is employed for 40 MHz channels.

The process then proceeds to Step 130 where the baseband processing module space and time encodes the time domain symbols for each of the parallel streams of interleaved data to produce the streams of symbols. In one embodiment, the space and time encoding may be done by space and time encoding the time domain symbols of the parallel streams of interleaved data into a corresponding number of streams of symbols utilizing an encoding matrix. Alternatively, the space and time encoding may be done by space and time encoding the time domain symbols of M-parallel streams of interleaved data into P-streams of symbols utilizing the encoding matrix, where P=2M. In one embodiment the encoding matrix may comprise a form of:

$$\begin{bmatrix} C_1 & C_2 & C_3 & C_4 & \cdots & C_{2M-1} & C_{2M} \\ -C_2^* & C_1^* & -C_4^* & C_3^* & \cdots & -C_{2M}^* & C_{2M-1}^* \end{bmatrix}$$

The number of rows of the encoding matrix corresponds to M and the number of columns of the encoding matrix corresponds to P. The particular symbol values of the constants within the encoding matrix may be real or imaginary numbers.

Figure 9:
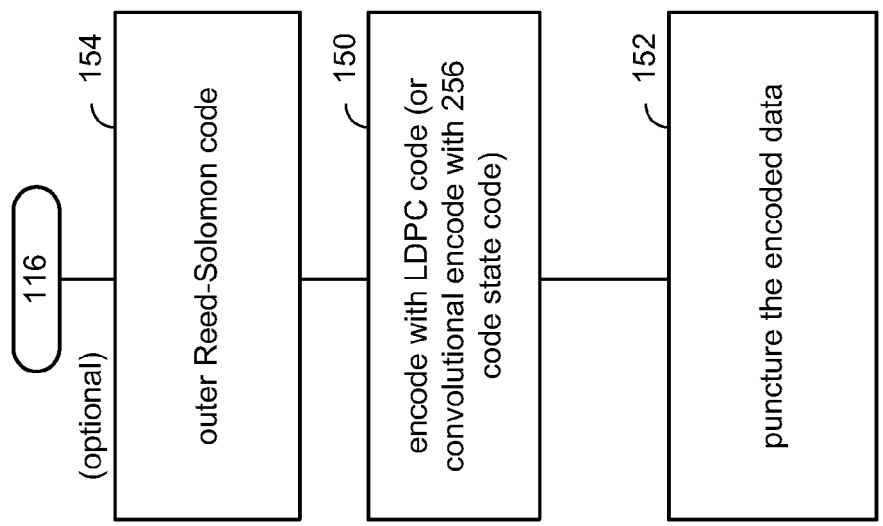
FIGS. 7-9 are diagrams illustrating various embodiments for encoding the scrambled data.
Figure 8:
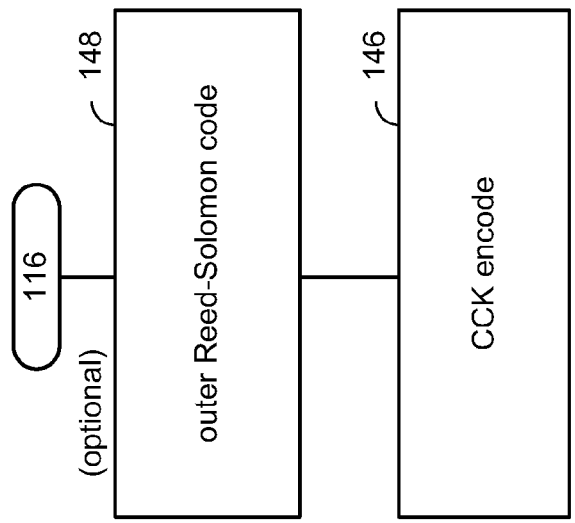
Figure 7:
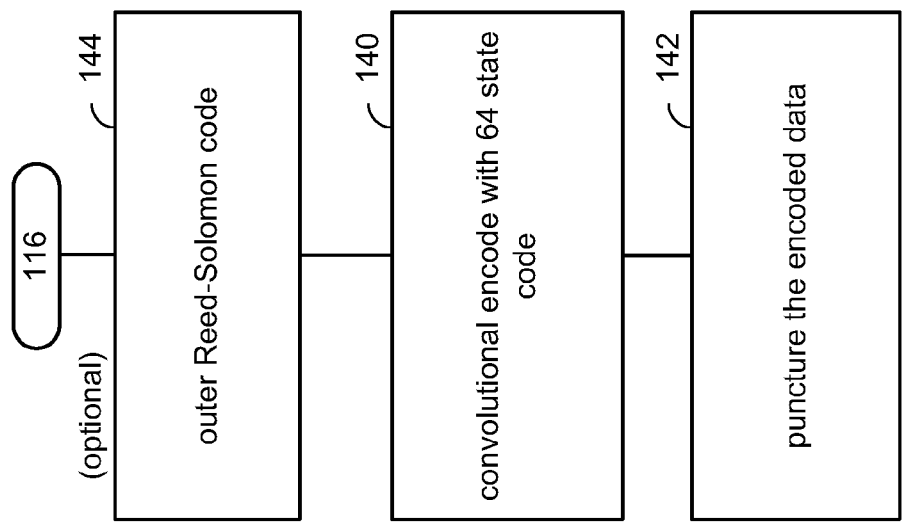

FIGS. 7-9 are diagrams illustrating various embodiments for encoding the scrambled data.

FIG. 7 is a diagram of one method that may be utilized by the baseband processing module to encode the scrambled data at Step 116 of FIG. 5. In this method, the encoding of FIG. 7 may include an optional Step 144 where the baseband processing module may optionally perform encoding with an outer Reed-Solomon (RS) code to produce RS encoded data. It is noted that Step 144 may be conducted in parallel with Step 140 described below.

Also, the process continues at Step 140 where the baseband processing module performs a convolutional encoding with a 64 state code and generator polynomials of $G_0=133_8$ and $G_1=171_8$ on the scrambled data (that may or may not have undergone RS encoding) to produce convolutional encoded data. The process then proceeds to Step 142 where the baseband processing module punctures the convolutional encoded data at one of a plurality of rates in accordance with the mode selection signal to produce the encoded data. Note that the puncture rates may include ½, ⅔ and/or ¾, or any rate as specified in tables 1-12. Note that, for a particular, mode, the rate may be selected for backward compatibility with IEEE 802.11(a), IEEE 802.11(g), or IEEE 802.11(n) rate requirements.

FIG. 8 is a diagram of another encoding method that may be utilized by the baseband processing module to encode the scrambled data at Step 116 of FIG. 5. In this embodiment, the encoding of FIG. 8 may include an optional Step 148 where the baseband processing module may optionally perform encoding with an outer RS code to produce RS encoded data. It is noted that Step 148 may be conducted in parallel with Step 146 described below.

The method then continues at Step 146 where the baseband processing module encodes the scrambled data (that may or may not have undergone RS encoding) in accordance with a complimentary code keying (CCK) code to produce the encoded data. This may be done in accordance with IEEE 802.11(b) specifications, IEEE 802.11(g), and/or IEEE 802.11(n) specifications.

FIG. 9 is a diagram of yet another method for encoding the scrambled data at Step 116, which may be performed by the baseband processing module. In this embodiment, the encoding of FIG. 9 may include an optional Step 154 where the baseband processing module may optionally perform encoding with an outer RS code to produce RS encoded data.

Then, in some embodiments, the process continues at Step 150 where the baseband processing module performs LDPC (Low Density Parity Check) coding on the scrambled data (that may or may not have undergone RS encoding) to produce LDPC coded bits. Alternatively, the Step 150 may operate by performing convolutional encoding with a 256 state code and generator polynomials of $G_0=561_8$ and $G_1=753_8$ on the scrambled data the scrambled data (that may or may not have undergone RS encoding) to produce convolutional encoded data. The process then proceeds to Step 152 where the baseband processing module punctures the convolutional encoded data at one of the plurality of rates in accordance with a mode selection signal to produce encoded data. Note that the puncture rate is indicated in the tables 1-12 for the corresponding mode.

The encoding of FIG. 9 may further include the optional Step 154 where the baseband processing module combines the convolutional encoding with an outer Reed Solomon code to produce the convolutional encoded data.

Figure 10A:
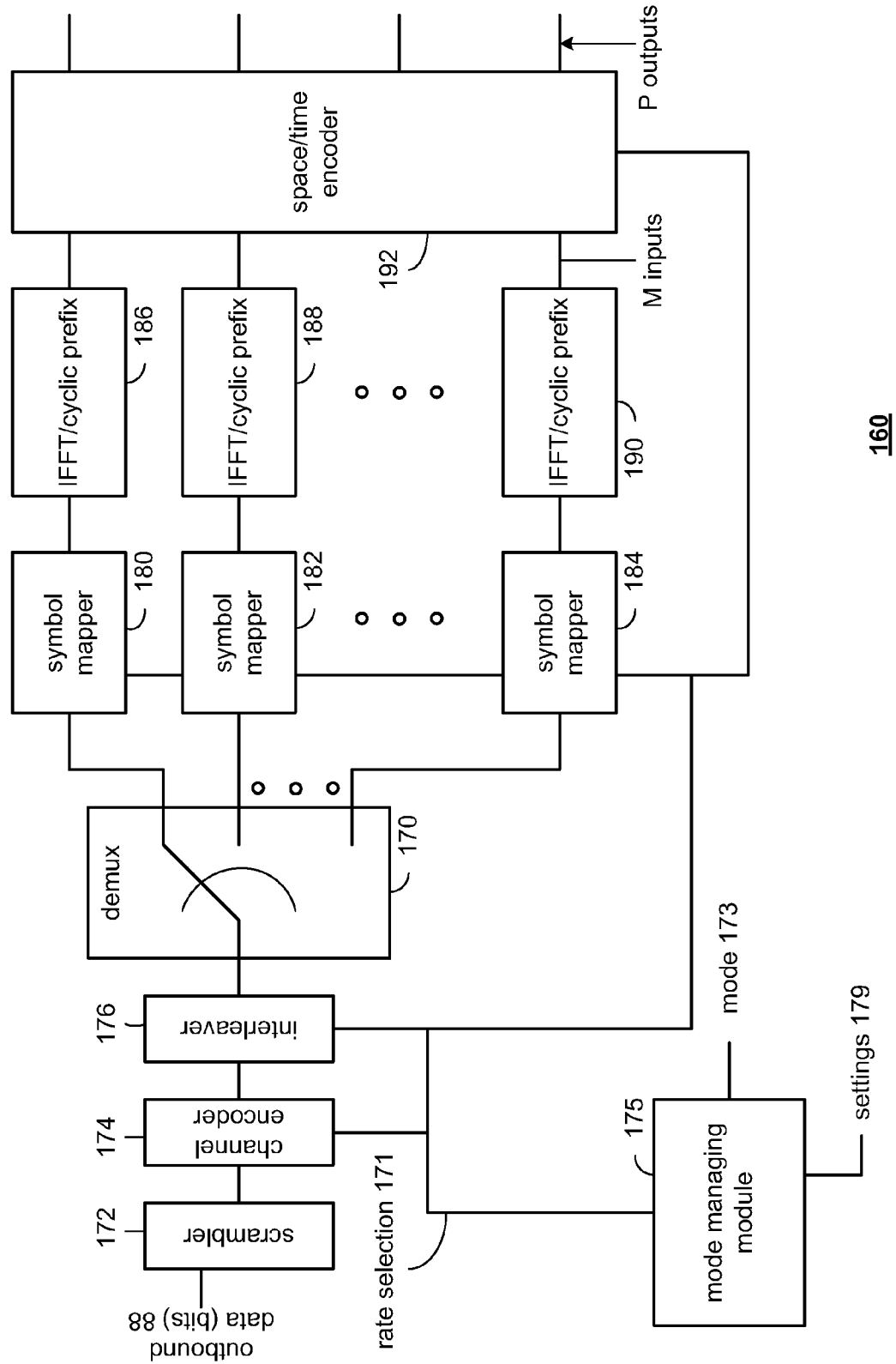
FIGS. 10A and 10B are diagrams illustrating embodiments of a radio transmitter.
Figure 10B:
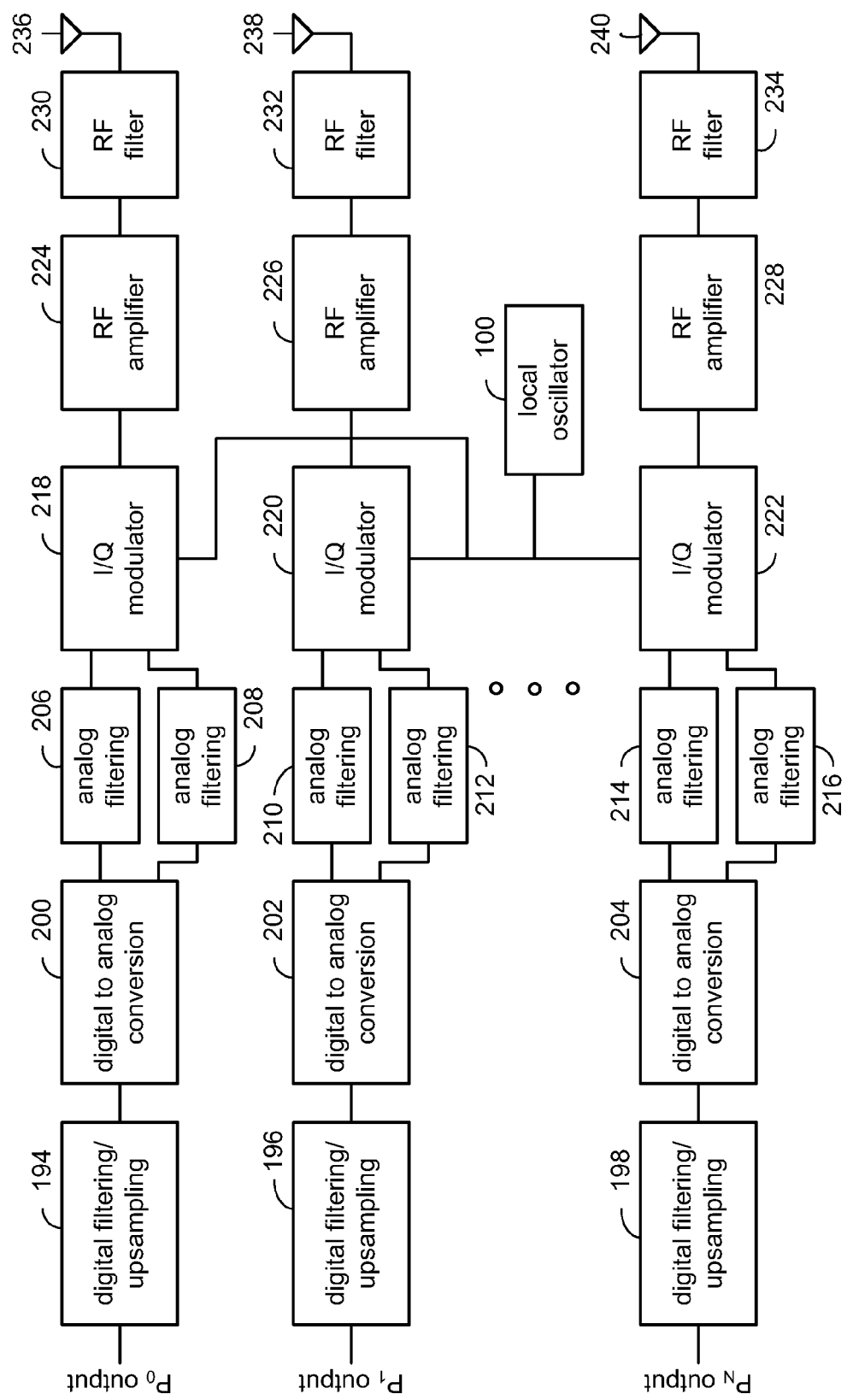

FIGS. 10A and 10B are diagrams illustrating embodiments of a radio transmitter. This may involve the PMD module of a WLAN transmitter. In FIG. 10A, the baseband processing is shown to include a scrambler 172, channel encoder 174, interleaver 176, demultiplexer 170, a plurality of symbol mappers 180-184, a plurality of inverse fast Fourier transform (IFFT)/cyclic prefix addition modules 186-190 and a space/time encoder 192. The baseband portion of the transmitter may further include a mode manager module 175 that receives the mode selection signal 173 and produces settings 179 for the radio transmitter portion and produces the rate selection 171 for the baseband portion. In this embodiment, the scrambler 172, the channel encoder 174, and the interleaver 176 comprise an error protection module. The symbol mappers 180-184, the plurality of IFFT/cyclic prefix modules 186-190, the space time encoder 192 comprise a portion of the digital baseband processing module.

In operations, the scrambler 172 adds (e.g., in a Galois Finite Field (GF2)) a pseudo random sequence to the outbound data bits 88 to make the data appear random. A pseudo random sequence may be generated from a feedback shift register with the generator polynomial of $S(x)=x^7+x^4+1$ to produce scrambled data. The channel encoder 174 receives the scrambled data and generates a new sequence of bits with redundancy. This will enable improved detection at the receiver. The channel encoder 174 may operate in one of a plurality of modes. For example, for backward compatibility with IEEE 802.11(a) and IEEE 802.11(g), the channel encoder has the form of a rate ½ convolutional encoder with 64 states and a generator polynomials of $G_0=133_8$ and $G_1=171_8$. The output of the convolutional encoder may be punctured to rates of ½, ⅔, and ¾ according to the specified rate tables (e.g., tables 1-12). For backward compatibility with IEEE 802.11(b) and the CCK modes of IEEE 802.11(g), the channel encoder has the form of a CCK code as defined in IEEE 802.11(b). For higher data rates (such as those illustrated in tables 6, 8 and 10), the channel encoder may use the same convolution encoding as described above or it may use a more powerful code, including a convolutional code with more states, any one or more of the various types of error correction codes (ECCs) mentioned above (e.g., RS, LDPC, turbo, TTCM, etc.) a parallel concatenated (turbo) code and/or a low density parity check (LDPC) block code. Further, any one of these codes may be combined with an outer Reed Solomon code. Based on a balancing of performance, backward compatibility and low latency, one or more of these codes may be optimal. Note that the concatenated turbo encoding and low density parity check will be described in greater detail with reference to subsequent Figures.

The interleaver 176 receives the encoded data and spreads it over multiple symbols and transmit streams. This allows improved detection and error correction capabilities at the receiver. In one embodiment, the interleaver 176 will follow the IEEE 802.11(a) or (g) standard in the backward compatible modes. For higher performance modes (e.g., such as those illustrated in tables 6, 8 and 10), the interleaver will interleave data over multiple transmit streams. The demultiplexer 170 converts the serial interleave stream from interleaver 176 into M-parallel streams for transmission.

Each symbol mapper 180-184 receives a corresponding one of the M-parallel paths of data from the demultiplexer. Each symbol mapper 180-182 lock maps bit streams to quadrature amplitude modulated QAM symbols (e.g., BPSK, QPSK, 16 QAM, 64 QAM, 256 QAM, et cetera) according to the rate tables (e.g., tables 1-12). For IEEE 802.11(a) backward compatibility, double Gray coding may be used.

The map symbols produced by each of the symbol mappers 180-184 are provided to the IFFT/cyclic prefix addition modules 186-190, which performs frequency domain to time domain conversions and adds a prefix, which allows removal of inter-symbol interference at the receiver. Note that the length of the IFFT and cyclic prefix are defined in the mode tables of tables 1-12. In general, a 64-point IFFT will be used for 20 MHz channels and 128-point IFFT will be used for 40 MHz channels.

The space/time encoder 192 receives the M-parallel paths of time domain symbols and converts them into P-output symbols. In one embodiment, the number of M-input paths will equal the number of P-output paths. In another embodiment, the number of output paths P will equal 2M paths. For each of the paths, the space/time encoder multiples the input symbols with an encoding matrix that has the form of $$\begin{bmatrix} c_1 & c_2 & c_3 & c_4 & \cdots & c_{2M-1} & c_{2M} \\ -c_2^* & c_1^* & -c_4^* & c_3^* & \cdots & -c_{2M}^* & c_{2M-1}^* \end{bmatrix}.$$

The rows of the encoding matrix correspond to the number of input paths and the columns correspond to the number of output paths.

FIG. 10B illustrates the radio portion of the transmitter that includes a plurality of digital filter/up-sampling modules 194-198, digital-to-analog conversion modules 200-204, analog filters 206-216, I/Q modulators 218-222, RF amplifiers 224-228, RF filters 230-234 and antennae 236-240. The P-outputs from the space/time encoder 192 are received by respective digital filtering/up-sampling modules 194-198. In one embodiment, the digital filters/up sampling modules 194-198 are part of the digital baseband processing module and the remaining components comprise the plurality of RF front-ends. In such an embodiment, the digital baseband processing module and the RF front end comprise a direct conversion module.

In operation, the number of radio paths that are active correspond to the number of P-outputs. For example, if only one P-output path is generated, only one of the radio transmitter paths will be active. As one of average skill in the art will appreciate, the number of output paths may range from one to any desired number.

The digital filtering/up-sampling modules 194-198 filter the corresponding symbols and adjust the sampling rates to correspond with the desired sampling rates of the digital-to-analog conversion modules 200-204. The digital-to-analog conversion modules 200-204 convert the digital filtered and up-sampled signals into corresponding in-phase and quadrature analog signals. The analog filters 206-214 filter the corresponding in-phase and/or quadrature components of the analog signals, and provide the filtered signals to the corresponding I/Q modulators 218-222. The I/Q modulators 218-222 based on a local oscillation, which is produced by a local oscillator 100, up-converts the I/Q signals into radio frequency signals.

The RF amplifiers 224-228 amplify the RF signals which are then subsequently filtered via RF filters 230-234 before being transmitted via antennae 236-240.

Figure 11A:
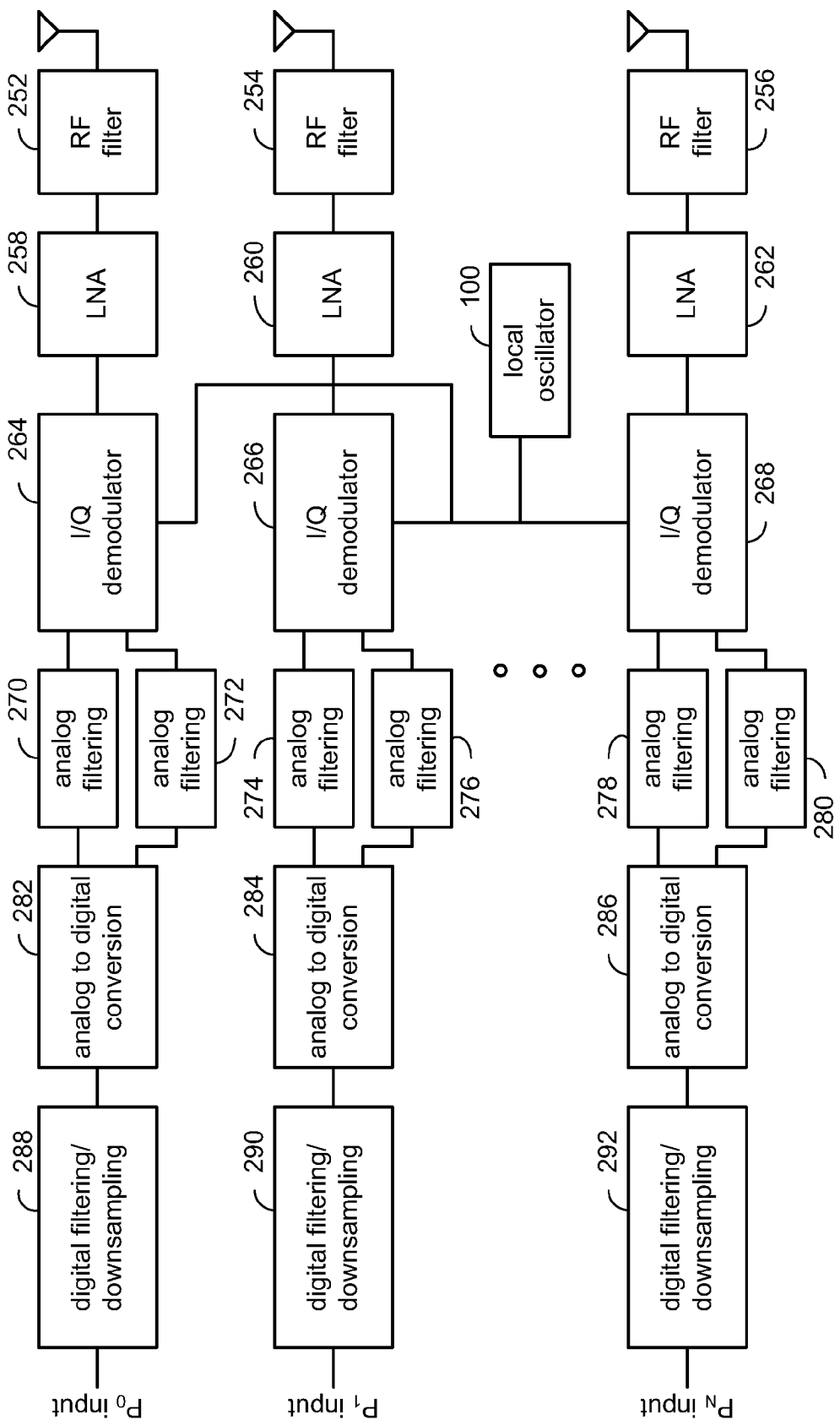
FIGS. 11A and 11B are diagrams illustrating embodiments of a radio receiver.
Figure 11B:
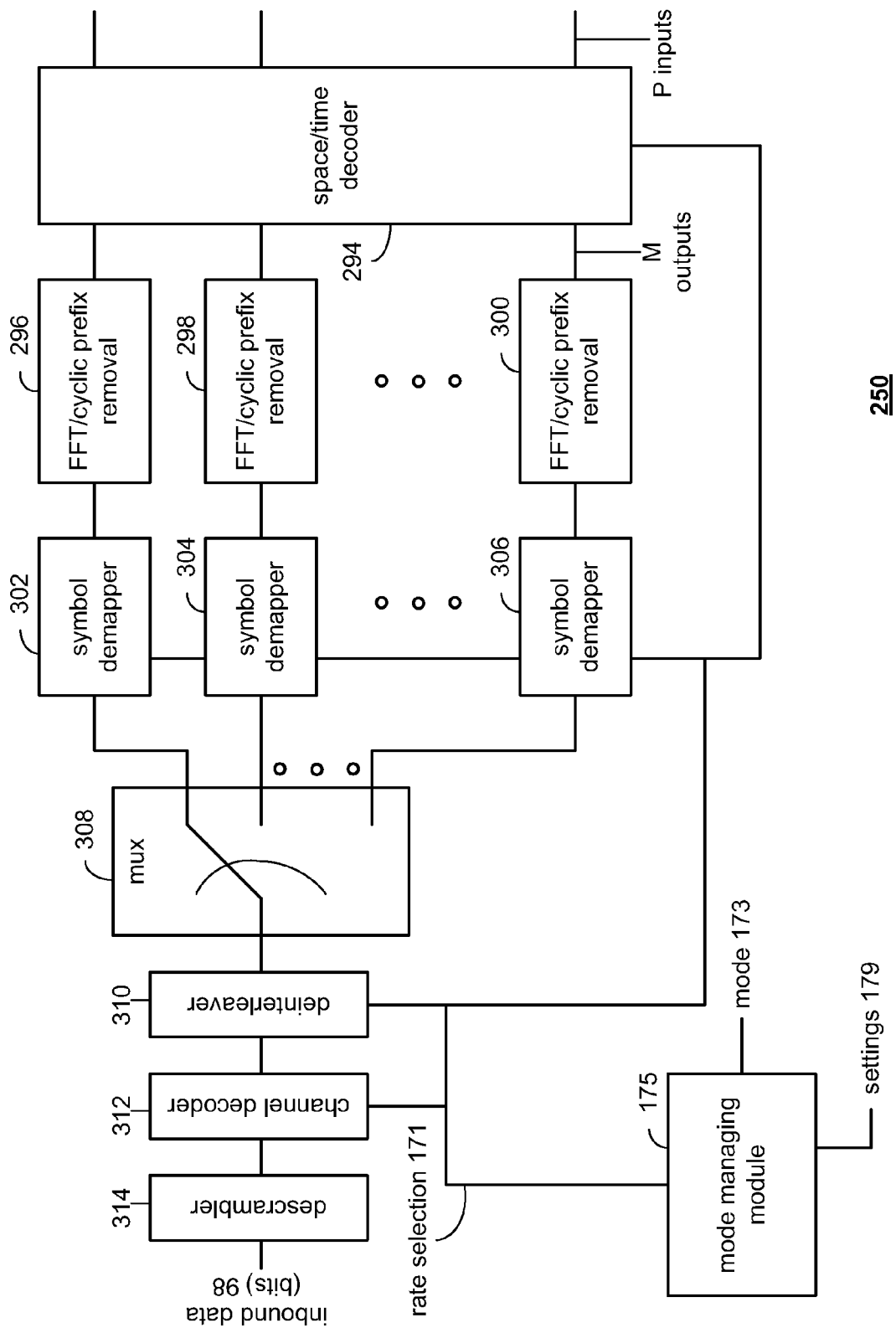

FIGS. 11A and 11B are diagrams illustrating embodiments of a radio receiver (as shown by reference numeral 250). These diagrams illustrate a schematic block diagram of another embodiment of a receiver. FIG. 11A illustrates the analog portion of the receiver which includes a plurality of receiver paths. Each receiver path includes an antenna, RF filters 252-256, low noise amplifiers 258-262, I/Q demodulators 264-268, analog filters 270-280, analog-to-digital converters 282-286 and digital filters and down-sampling modules 288-290.

In operation, the antennae receive inbound RF signals, which are band-pass filtered via the RF filters 252-256. The corresponding low noise amplifiers 258-262 amplify the filtered signals and provide them to the corresponding I/Q demodulators 264-268. The I/Q demodulators 264-268, based on a local oscillation, which is produced by local oscillator 100, down-converts the RF signals into baseband in-phase and quadrature analog signals.

The corresponding analog filters 270-280 filter the in-phase and quadrature analog components, respectively. The analog-to-digital converters 282-286 convert the in-phase and quadrature analog signals into a digital signal. The digital filtering and down-sampling modules 288-290 filter the digital signals and adjust the sampling rate to correspond to the rate of the baseband processing, which will be described in FIG. 11B.

FIG. 11B illustrates the baseband processing of a receiver. The baseband processing includes a space/time decoder 294, a plurality of fast Fourier transform (FFT)/cyclic prefix removal modules 296-300, a plurality of symbol demapping modules 302-306, a multiplexer 308, a deinterleaver 310, a channel decoder 312, and a descramble module 314. The baseband processing module may further include a mode managing module 175, which produces rate selections 171 and settings 179 based on mode selections 173. The space/time decoding module 294, which performs the inverse function of space/time encoder 192, receives P-inputs from the receiver paths and produce M-output paths. The M-output paths are processed via the FFT/cyclic prefix removal modules 296-300 which perform the inverse function of the IFFT/cyclic prefix addition modules 186-190 to produce frequency domain symbols.

The symbol demapping modules 302-306 convert the frequency domain symbols into data utilizing an inverse process of the symbol mappers 180-184. The multiplexer 308 combines the demapped symbol streams into a single path.

The deinterleaver 310 deinterleaves the single path utilizing an inverse function of the function performed by interleaver 176. The deinterleaved data is then provided to the channel decoder 312 which performs the inverse function of channel encoder 174. The descrambler 314 receives the decoded data and performs the inverse function of scrambler 172 to produce the inbound data 98.

Figure 12:
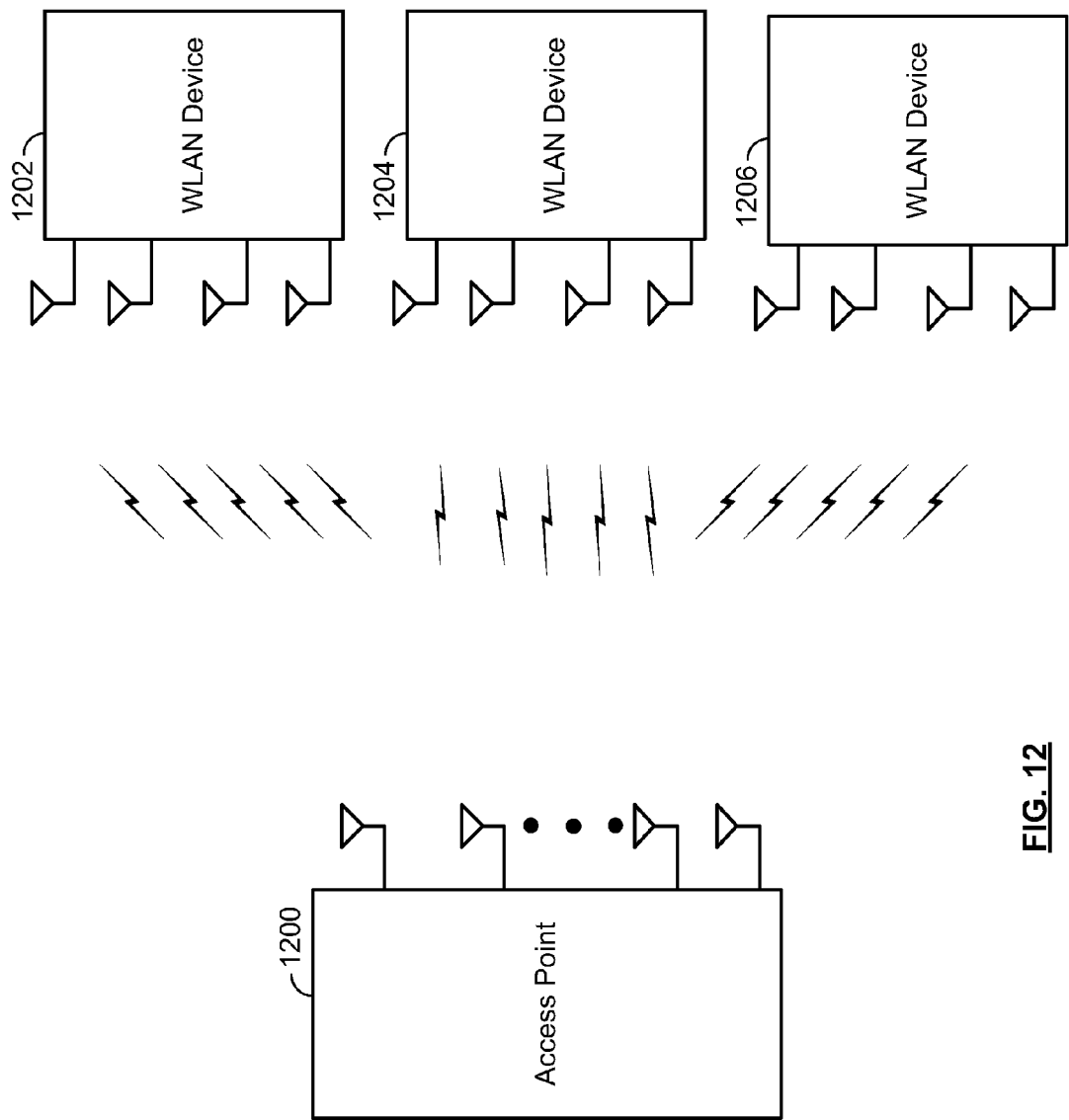
FIG. 12 is a diagram illustrating an embodiment of an access point (AP) and multiple wireless local area network (WLAN) devices operating according to one or more various aspects and/or embodiments of the invention.

FIG. 12 is a diagram illustrating an embodiment of an access point (AP) and multiple wireless local area network (WLAN) devices operating according to one or more various aspects and/or embodiments of the invention. The AP point 1200 may compatible with any number of communication protocols and/or standards, e.g., IEEE 802.11(a), IEEE 802.11(b), IEEE 802.11(g), IEEE 802.11(n), as well as in accordance with various aspects of invention. According to certain aspects of the present invention, the AP supports backwards compatibility with prior versions of the IEEE 802.11x standards as well. According to other aspects of the present invention, the AP 1200 supports communications with the WLAN devices 1202, 1204, and 1206 with channel bandwidths, MIMO dimensions, and at data throughput rates unsupported by the prior IEEE 802.11x operating standards. For example, the access point 1200 and WLAN devices 1202, 1204, and 1206 may support channel bandwidths from those of prior version devices and from 40 MHz to 1.28 GHz and above. The access point 1200 and WLAN devices 1202, 1204, and 1206 support MIMO dimensions to 4×4 and greater. With these characteristics, the access point 1200 and WLAN devices 1202, 1204, and 1206 may support data throughput rates to 1 GHz and above.

The AP 1200 supports simultaneous communications with more than one of the WLAN devices 1202, 1204, and 1206. Simultaneous communications may be serviced via OFDM tone allocations (e.g., certain number of OFDM tones in a given cluster), MIMO dimension multiplexing, or via other techniques. With some simultaneous communications, the AP 1200 may allocate one or more of the multiple antennae thereof respectively to support communication with each WLAN device 1202, 1204, and 1206, for example.

Further, the AP 1200 and WLAN devices 1202, 1204, and 1206 are backwards compatible with the IEEE 802.11 (a), (b), (g), and (n) operating standards. In supporting such backwards compatibility, these devices support signal formats and structures that are consistent with these prior operating standards.

Generally, communications as described herein may be targeted for reception by a single receiver or for multiple individual receivers (e.g. via multi-user multiple input multiple output (MU-MIMO), and/or OFDMA transmissions, which are different than single transmissions with a multi-receiver address). For example, a single OFDMA transmission uses different tones or sets of tones (e.g., clusters or channels) to send distinct sets of information, each set of set of information transmitted to one or more receivers simultaneously in the time domain. Again, an OFDMA transmission sent to one user is equivalent to an OFDM transmission. A single MU-MIMO transmission may include spatially-diverse signals over a common set of tones, each containing distinct information and each transmitted to one or more distinct receivers. Some single transmissions may be a combination of OFDMA and MU-MIMO. MIMO transceivers illustrated may include SISO, SIMO, and MISO transceivers. The clusters employed for such communications may be continuous (e.g., adjacent to one another) or discontinuous (e.g., separated by a guard interval of band gap). Transmissions on different OFDMA clusters may be simultaneous or non-simultaneous. Such wireless communication devices as described herein may be capable of supporting communications via a single cluster or any combination thereof. Legacy users and new version users (e.g., TGac MU-MIMO, OFDMA, MU-MIMO/OFDMA, etc.) may share bandwidth at a given time or they can be scheduled at different times for certain embodiments.

Figure 13:
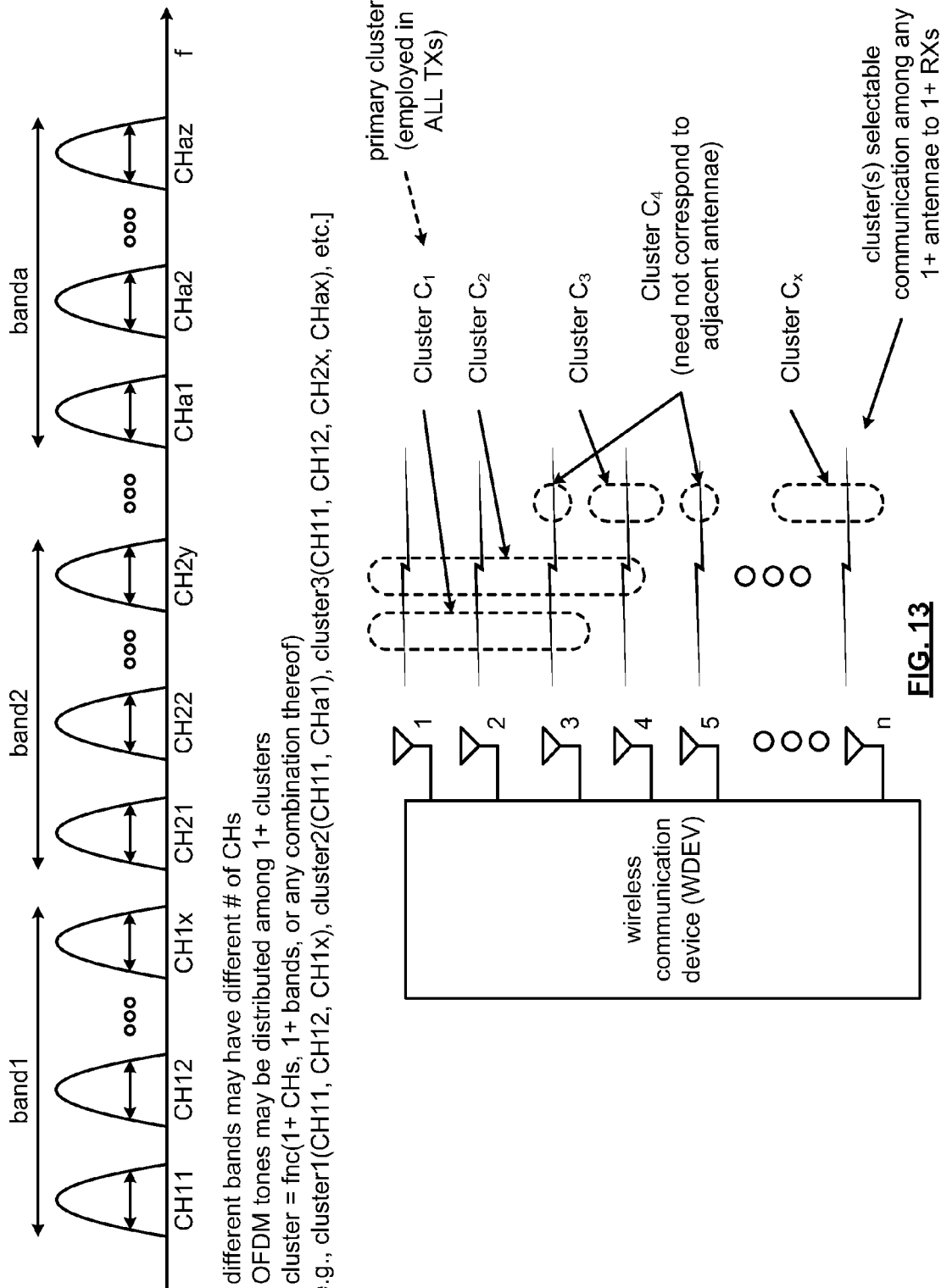
FIG. 13 is a diagram illustrating an embodiment of a wireless communication device, and clusters, as may be employed for supporting communications with at least one additional wireless communication device.

FIG. 13 is a diagram illustrating an embodiment of a wireless communication device, and clusters, as may be employed for supporting communications with at least one additional wireless communication device. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination one or more channels among one or more bands.

The wireless communication device of this diagram may be of any of the various types and/or equivalents described herein (e.g., AP, WLAN device, or other wireless communication device including, though not limited to, any of those depicted in FIG. 1, etc.). The wireless communication device includes multiple antennae from which one or more signals may be transmitted to one or more receiving wireless communication devices and/or received from one or more other wireless communication devices.

Such clusters may be used for transmissions of signals via various one or more selected antennae. For example, different clusters are shown as being used to transmit signals respectively using different one or more antennae.

Figure 14:
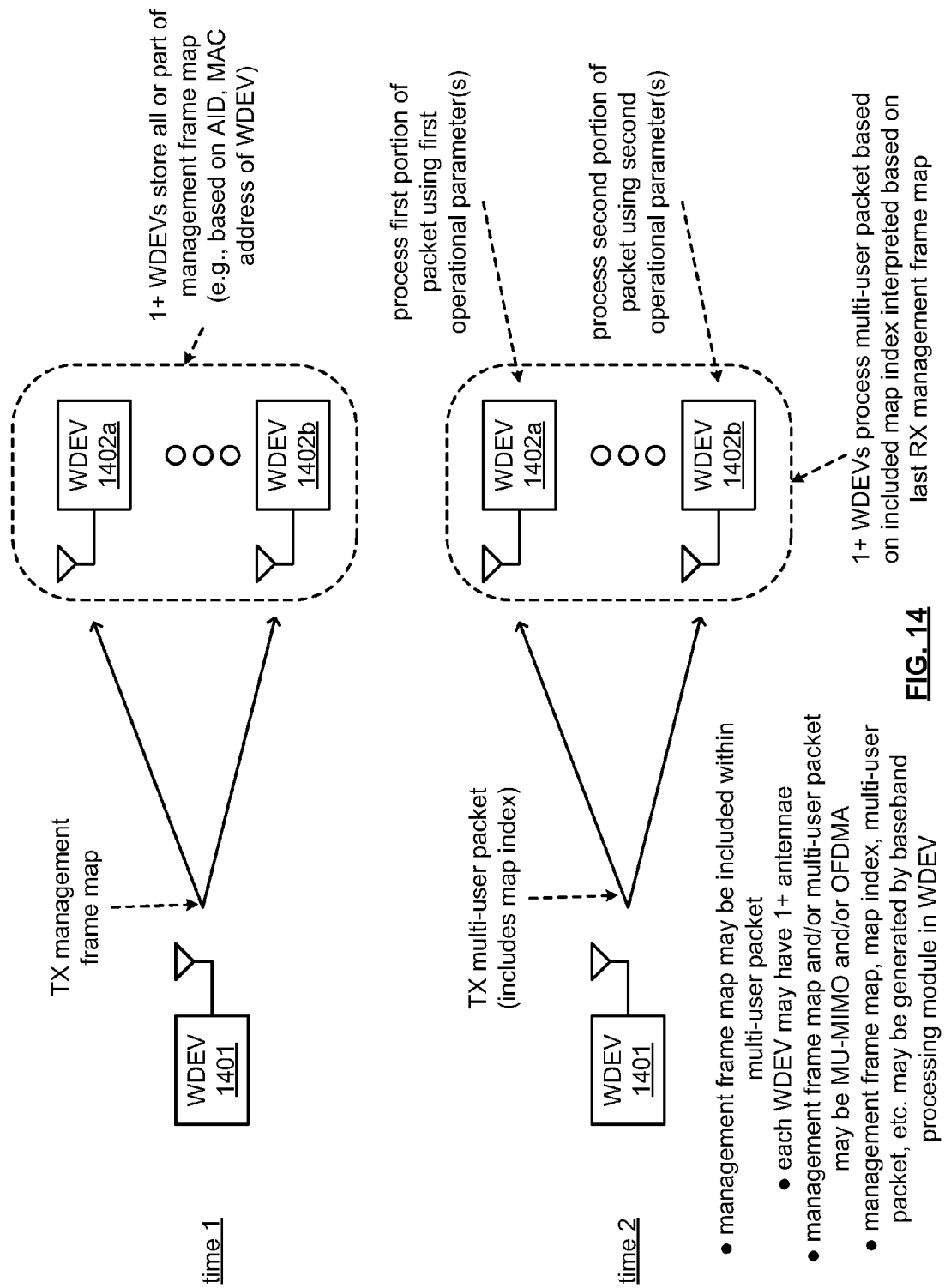
FIG. 14 is a diagram illustrating an embodiment of communications between at least two wireless communication devices in accordance with a management frame map, that includes index values paired with operational parameters, and at least one subsequent multi-user packet including a map index therein.

FIG. 14 is a diagram illustrating an embodiment of communications between at least two wireless communication devices in accordance with a management frame map, that includes index values paired with operational parameters, and at least one subsequent multi-user packet including a map index therein. Two different times are shown for effectuating communications between at least two wireless communication devices 1401 and 1402a (and up to additional wireless communication devices as shown generally up to wireless communication device 1402b). The wireless communication device 1401 may be an access point (AP) and the other wireless communication devices 1402a through 1402b may be wireless stations (STAs); in an alternative embodiment, all of the wireless communication devices 1401, 1402a through 1402b may be STAs.

In operation, the wireless communication device 1401 operates by transmitting a management frame map to the one or more wireless communication devices 1402a through 1402b. Then, the one or more wireless communication devices 1402a through 1402b receives and stores all or part of the management frame map. The wireless communication device 1401 then operates by transmitting a multi-user packet to the one or more wireless communication devices 1402a through 1402b. The multi-user packet includes a map index therein that indicates information contained in the map information including at least one operational parameter to be employed by at least one of the wireless communication devices 1402a through 1402b when processing at least one field within the multi-user packet. This map index generally will proceed the at least one field within the multi-user packet to which the map index corresponds (e.g., indicating which operational parameter(s) to use to process that at least one field). The form of the management frame map and/or the multi-user packet may be varied, including being a multiple input multiple output (MU-MIMO) packet or an orthogonal frequency division multiple access (OFDMA) packet, or a combination MU-MIMO/OFDMA packet.

Such management frame maps may be transmitted from a first wireless communication device to one or more second wireless communication devices as a management exchange, which may be effectuated using beacons (e.g., such as when a particular management frame map is to be employed by or is intended for multiple wireless communication devices). Alternatively, management frames may be transmitted as one or more uni-cast (UCAST) exchanges with one or more of the wireless communication devices. For example, the map information may be truncated to only what is relevant for a particular wireless communication device that is the UCAST addressee.

If desired, one or more additional management frame maps may be provided from the wireless communication device 1401 to the one or more wireless communication devices 1402a through 1402b to modify the manner in which subsequent map indices (e.g., within subsequently transmitted multi-user packets) are interpreted for identifying at least one operational parameter for use in processing of at least one respective field within such subsequently transmitted multi-user packets. It is noted, in finite precision systems employing only a certain number of bits for indicating the map indices and associated operational parameter information within a management frame map, the number of operational parameters that may be indicated may be limited. However, the principles presented herein may of course be modified to accommodate various numbers of operational parameters (e.g., by scaling the number of bits and/or map indices within a management frame map to indicate operational parameters or by transmitting more than one management frame map, each with at least one different map index value and associated operational parameter information).

For example, a first management frame map may be employed for directing operation and processing (e.g., using certain operational parameters) of at least one respective field within a subsequently transmitted first multi-user packet or first plurality of multi-user packets. Then, a second management frame map may be employed for directing operation and processing (e.g., using certain operational parameters) of at least one respective field within a subsequently transmitted second multi-user packet or second plurality of multi-user packets.

Various examples of such operational parameters that may be employed for directing operation and processing of a subsequently transmitted multi-user packet include, though are not limited to, any one of a cluster on which the at least one field following the map index within the multi-user packet is transmitted, a modulation coding scheme (MCS) (e.g., including constellation shape, type, and mapping of constellation points therein), a forward error correction (FEC) coding scheme (e.g., such as turbo, turbo trellis coded modulation (TTCM), convolutional coding, LDPC (Low Density Parity Check) coding, Reed-Solomon (RS) coding, etc.), space time block coding (STBC), an antenna configuration of one or more antennae within the wireless communication device 1401, etc.

With respect to a cluster indication as may be indicated by a map index (as interpreted in view of a previously received management frame map), the cluster indication may indicate that a different cluster may be employed for communicating a subsequent portion of the multi-user packet than was used for transmitting a previous portion (e.g., a PHY header or a portion of a PHY heder) of the multi-user packet. In other words, all of the portions of a multi-user packet need not be communicated using a same cluster. A first portion of the multi-user packet (e.g., PHY header or a portion of a PHY heder) may be transmitted using a first cluster, and a second portion of the multi-user packet (e.g., field for processing by a selected one or more of the wireless communication devices 1402a through 1402b) may be transmitted using a second cluster. As described elsewhere herein, a cluster may be viewed as being composed of at least one channel within at least one band. For example, a cluster may be viewed as a single channel within a single band. Alternatively, a cluster may be viewed as multiple channels distributed across one or more bands.

Within this and other embodiments, it is noted that the map index of a multi-user packet (as interpreted using a previously received management frame map) may direct a first portion of the multi-user packet to be processed using a first one or more operational parameters and may also direct a second portion of the multi-user packet to be processed using a second one or more operational parameters. In other words, a given wireless communication device may be directed to process different portions of a singularly received multi-user packet using and in accordance with different respective operational parameters. For example, a header of a multi-user packet may be processed in accordance with a first one or more operational parameters, and a data field (e.g., including data or information bits intended for one or more of the wireless communication devices) of the multi-user packet may be processed in accordance with a second one or more operational parameters.

Figure 15:
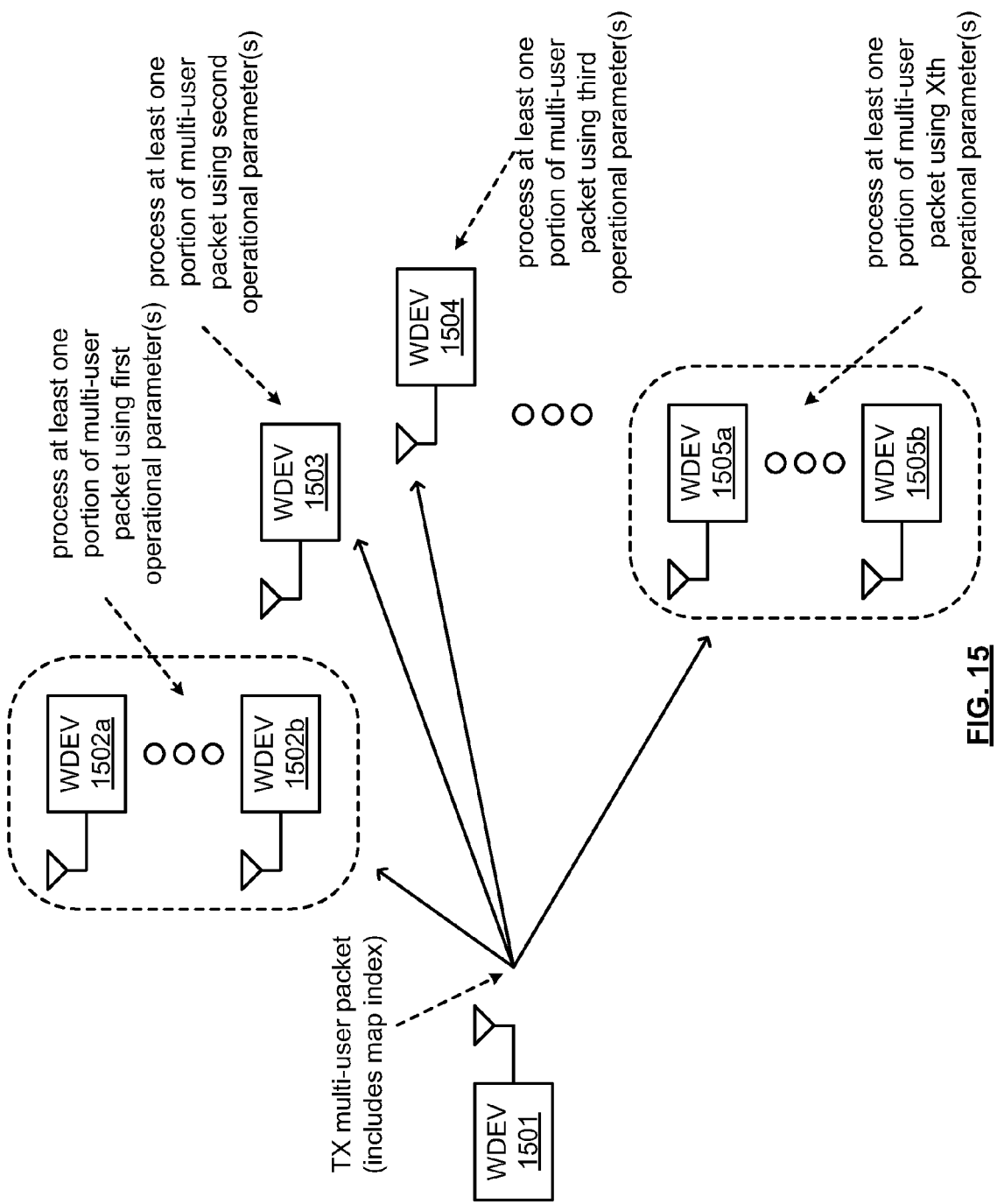
FIG. 15 is a diagram illustrating an embodiment of communications between multiple wireless communication devices in accordance with a management frame map and at least one subsequent multi-user packet including a map index therein.

FIG. 15 is a diagram illustrating an embodiment of communications between multiple wireless communication devices in accordance with a management frame map and at least one subsequent multi-user packet including a map index therein. With respect to this embodiment, a management frame map may be considered as having already been transmitted from wireless communication device 1501 to the various wireless communication devices 1502a through 1502b, 1503, 1504, and 1505a through 1505b. As appropriate (e.g., if the management frame map is intended for one or more of the wireless communication devices that receives it, such as may be determined by examining the address of the receiving wireless communication device that identifies an association ID (AID), a media access control (MAC) address, etc.), certain of those wireless communication devices will store all or part (e.g., those portion(s) intended and appropriate for that wireless communication device) of the management frame map for subsequent use in interpreting a map index within a subsequently received multi-user packet for directing processing of at least one field therein. Alternatively, the information in the map portion of the multi-user packet may include AID or MAC address information specifically associated with each map index value. At least the information from the management frame map that is relevant to the receiver as indicated through management frame map receiver addressing combined with any addressing information contained in the map information may be stored locally in the PHY of the wireless communication device, such that the wireless communication device performs a map index directed lookup into the associated memory location in which this information from the management frame map has been stored.

For example, a map index of a multi-user packet may indicate that the multi-user packet is intended only for a subset of the plurality of wireless communication devices (e.g., for only wireless communication devices 1502a through 1502b, for only a singular wireless communication device 1503, etc.). When the multi-user packet is received by a wireless communication device for which the multi-user packet is not intended (e.g., such as may be determined by an association ID (AID), that wireless communication device may discard the remainder of the multi-user packet.

As can be seen in this embodiment, groups or subsets of the wireless communication devices may be grouped together such that one or more of the portions of a multi-user packet are intended to be processed by more than one of the wireless communication devices (e.g., those within a group or subset) in accordance with a common one or more operational parameters. Other of the wireless communication devices may process the same or other one or more fields within the multi-user packet in accordance with a different one or more operational parameters corresponding to the map information associated with the map index value in management map frames that are received. For example, the wireless communication device 1503 may process a different one or more portions of the multi-user packet using a different one or more operational parameters; the wireless communication device 1504 may process yet a different one or more portions of the multi-user packet using yet a different one or more operational parameters, etc.

Figure 16:
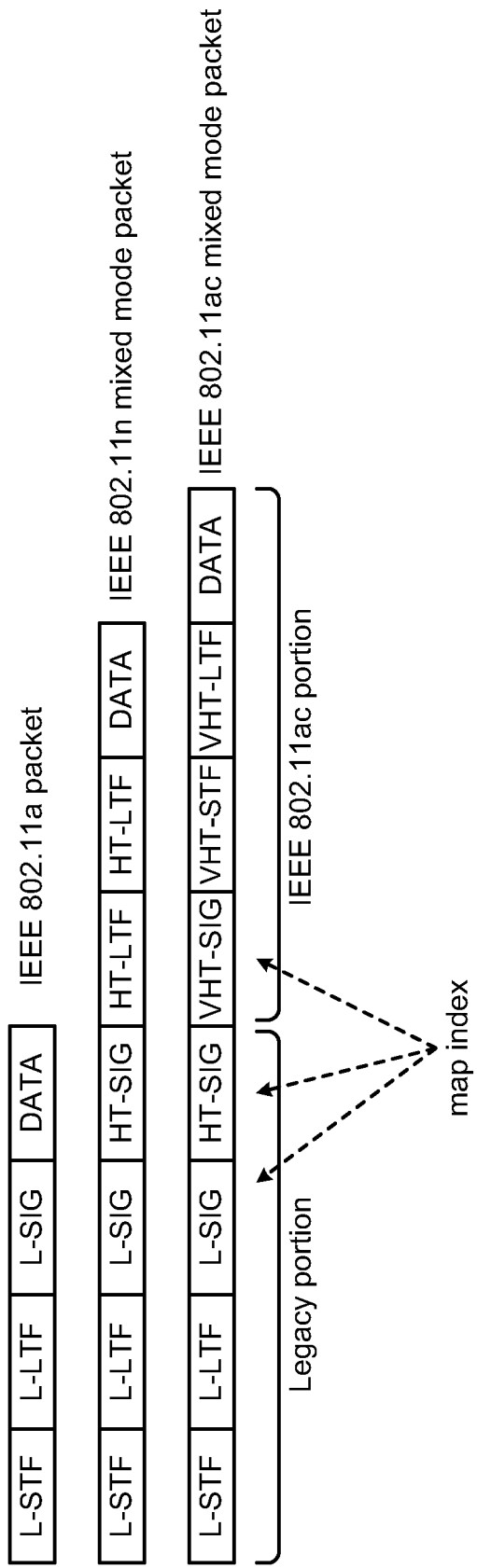
FIG. 16 is a diagram illustrating an embodiment of a frame format that may be used in conjunction with a wireless communication device such as a WLAN device.

FIG. 16 is a diagram illustrating an embodiment of a frame format that may be used in conjunction with a wireless communication device such as a WLAN device. Packet construction in accordance with the various principles presented herein, generally speaking, may include a preamble, a signal field, and a payload. Again, generally, the preamble is used for carrier acquisition, synchronization, channel estimation, etc. The signal field is used to communicate frame specific parameters (e.g., coding rate, frame length, etc.) to a receiving device. The payload is the data portion of the packet.

A frame format may be modified based on a number of parameters, including, dependence upon the presence of other wireless communication devices in a communication system. In some instances, a communication may include various types of wireless communication devices having different respective capability sets (e.g., legacy devices, newer devices, mixed mode devices, etc.).

For example, with some embodiments, in the 5 GHz spectrum, legacy devices may include those being compliant in accordance with IEEE 802.11(a) and IEEE 802.11(n). Legacy devices must be able to recognize that a packet has been transmitted and remain off the air for the duration of the packet (i.e., not transmit energy into the communication channel or communication medium in order to give access to other communication devices). Thus, packets formed in accordance with the various aspects presented herein may include certain portions therein that are compliant with legacy or prior standards, recommended practices, etc. As one example, a new packet may include a legacy preamble and a signal field along with a new, modified version of a payload. With such a novel packet structure, a legacy device will still be able to recognize the legacy preamble and decode the legacy signal field. The legacy signal field contains information that tells the legacy devices how long the packet will be on the air (i.e., occupy or be using the communication channel or communication medium). The legacy signal field does not contain IEEE 802.11ac specific parameters (these are contained in the IEEE 802.11ac signal field).

A packet having a particular type of frame format, such as a Greenfield packet that does not include certain portions therein that are compliant with legacy or prior standards, recommended practices, etc. (i.e., non legacy supporting), may be used when only new version devices are present (e.g., no legacy or prior devices having compatibility with previous standards and/or recommended practices). Such a packet structure (Greenfield) need not include a legacy compatible preamble or a legacy compatible signal field, since no such devices are present. The Greenfield packet may have a shorter preamble and a signal field that yields a higher throughput.

Referring particularly to FIG. 16, various packet structures are illustrated as being compliant with various IEEE 802.11x standards (e.g., where x is a, n, ac, respectively). An IEEE 802.11a packet is shown including a legacy short training field (L-STF), a legacy long training field (L-LTF), a legacy signal field (L-SIG), followed by a data field.

An IEEE 802.11n mixed mode packet is shown including a legacy short training field (L-STF), a legacy long training field (L-LTF), a legacy signal field (L-SIG), a high throughput signal field (HT-SIG), multiple high throughput long training fields (HT-LTF), followed by a data field.

An IEEE 802.11ac mixed mode packet is shown including a legacy short training field (L-STF), a legacy long training field (L-LTF), a legacy signal field (L-SIG), a high throughput signal field (HT-SIG), a very high throughput signal field (VHT-SIG), a very high throughput short training field (VHT-STF), a very high throughput long training field (VHT-LTF), followed by a data field.

As may be seen when comparing the various types of packets, the IEEE 802.11 ac mixed mode packet does have some similarity with respect to the IEEE 802.11n mixed mode packet, as shown by a legacy portion (e.g., similar to the IEEE 802.11n mixed mode packet and having some similarity to the IEEE 802.11a packet) and an IEEE 802.11ac portion including the very high throughput portions.

The IEEE 802.11ac packet includes the IEEE 802.11a preamble and signal field for detection by devices compliant with and operable with IEEE 802.11a. Such a packet may have set a fixed rate of information of 6 Mbps and a corresponding length based on its respective time on the air (i.e., time being transmitted via the communication channel or communication medium). The IEEE 802.11ac mixed mode packet is limited to the time on the air (channel/medium) corresponding to the maximum size of an IEEE 802.11a packet.

The IEEE 802.11ac mixed mode packet includes the IEEE 802.11n preamble and signal field for detection by devices compliant with and operable with IEEE 802.11n. When using the structure that is compatible with devices compliant with and operable with IEEE 802.11n, the rate is set to modulation code set (MCS) 0, regular Guard interval (GI), no space time block coding (STBC), and a corresponding length based on time on air (channel/medium). The HT-SIG cyclic redundancy check (CRC) must be valid so that HT device accepts the signal field and defers the medium (i.e., does not occupy the channel/air. This structure includes the VHT-SIG field shown as being immediately after the HT-SIG field. The VHT-SIG field is 90 degrees rotated with respect to HT-STF field to allow for better discrimination between the two respective fields. Other rotations (e.g., besides only 90 degrees) are alternatively and also possible to assist in such discrimination as preferred in other embodiments. As such, the probability of considering the HT-SIG field and thereby treating a VHT mixed mode frame as in fact being a valid HT frame should be relatively small. This problem typically occurs when an HT device finds its MAC address and the frame check sequence (FCS) passes in its decoding of an IEEE 802.11ac mixed mode frame. The VHT short training field (VHT-STF), VHT long training field (VHT-LTF), and payload data portion all follow VHT-SIG field in the 802.11ac mixed mode packet.

With respect to the map index that may be included within a multi-user packet as described herein, such a map index may be located in any of a variety of locations within the multi-user packet, and may generally be preferred to be located closer to a beginning of the multi-user packet than an end of the multi-user packet. In one embodiment, the map index is located within a SIG field of the PHY header. Of course, alternative locations for such a map index may be employed in different embodiments without departing from the scope and spirit of the invention.

Figure 17:
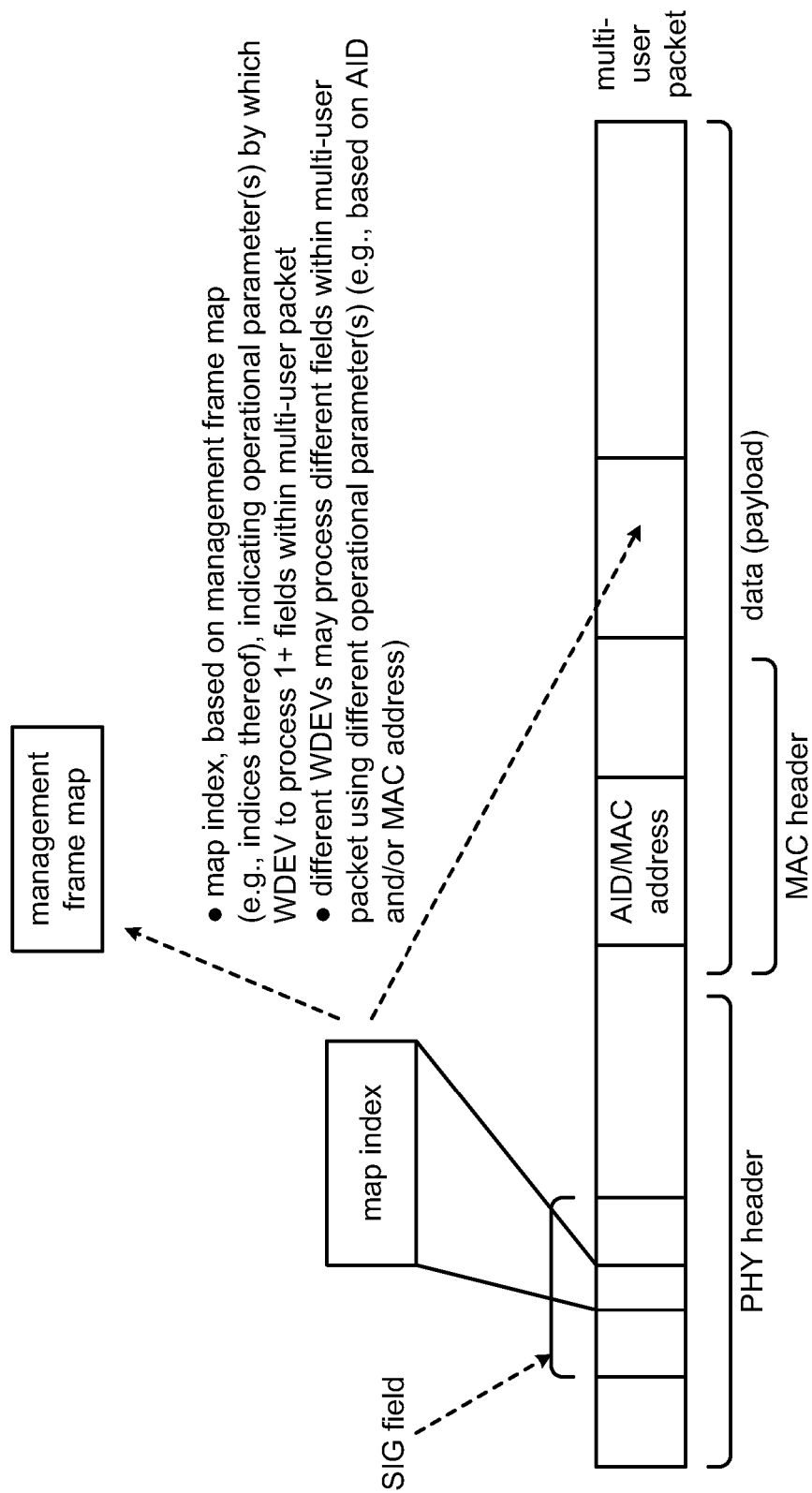
FIG. 17 is a diagram illustrating an embodiment of a multi-user packet and locations of a map index and at least one field therein that is processed based on the map index as interpreted in view of a management frame map.

FIG. 17 is a diagram illustrating an embodiment of a multi-user packet and locations of a map index and at least one field therein that is processed based on the map index as interpreted in view of a management frame map. This diagram shows how a received multi-user packet, that includes a map index therein, may undergo processing. The multi-user packet is received, and the map index is extracted there from. It may be understood that a management frame map has already been received by the wireless communication device processing the map, and all or part of the management frame map have been processed, stored, etc. for use in processing this and possibly other multi-user packets.

The map index may be located in a PHY header of the multi-user packet in some embodiments. The map index may be located in a SIG field of the multi-user packet in certain embodiments. Once the map index is extracted, it is interpreted in view of a previously received management frame map. This map index, as translated in terms of a previously received management frame map, indicates one or more operational parameters by which one or more fields within the remainder of the multi-user packet are to be processed. Again, as within other embodiments described herein, different fields within the multi-user packet may be processed using different operational parameter(s) such as directed by the map index of the multi-user packet (as interpreted or translated based on a previously received management frame map).

Figure 18:
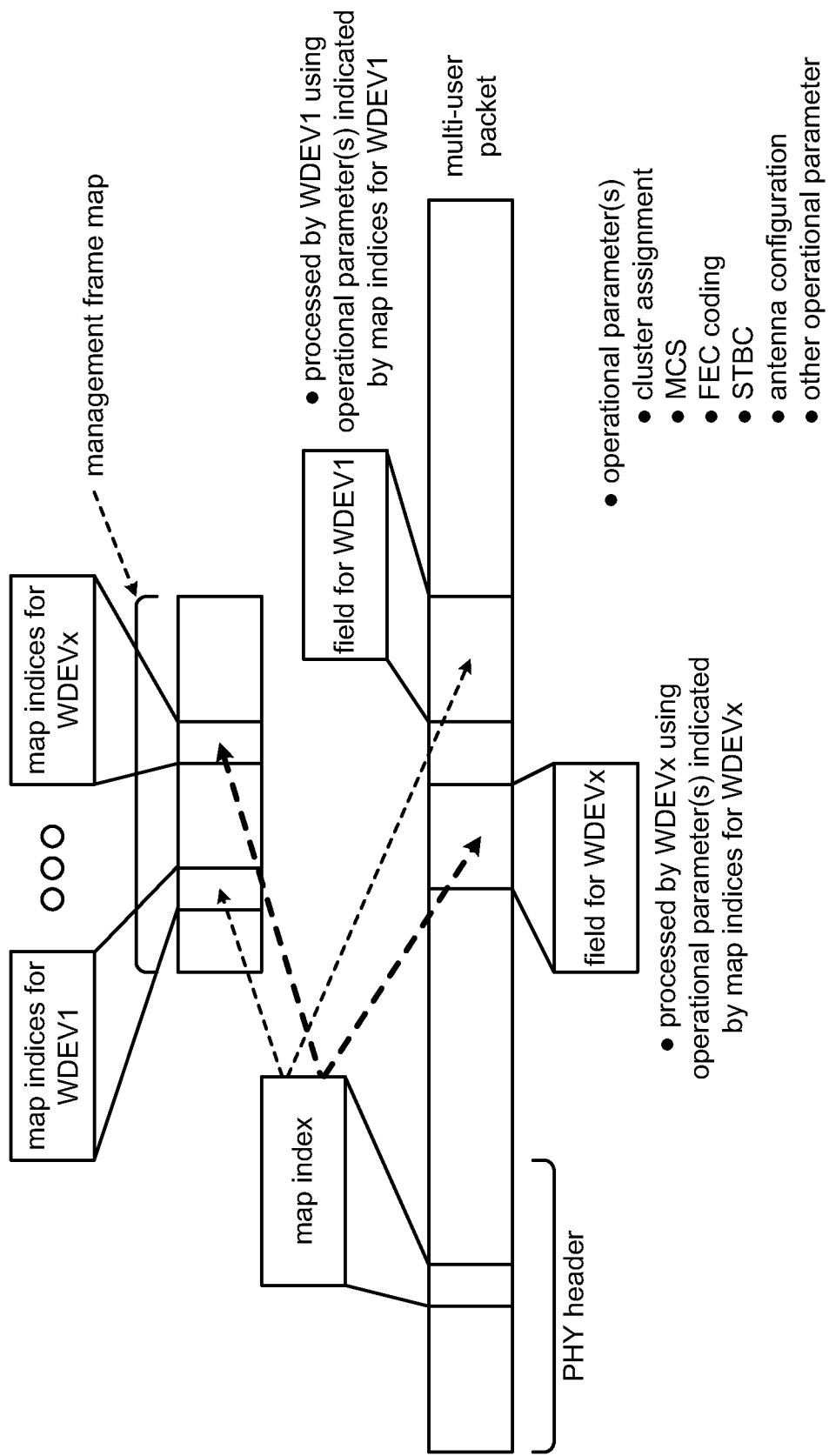
FIG. 18 is a diagram illustrating an embodiment of different processing of a common multi-user packet by at least two different wireless communication devices.

FIG. 18 is a diagram illustrating an embodiment of different processing of a common multi-user packet by at least two different wireless communication devices. As also mentioned elsewhere herein, different wireless communication devices may process the very same multi-user packet, yet process that same multi-user packet differently. For example, based on an association ID (AID) or media access control (MAC) address corresponding to the multi-user packet, a particular wireless communication device pay process selective one or more portions of the multi-user packet based on one or more operational parameters specific to that wireless communication device.

For example, previously received management frame maps may have different operational parameters or operational information associated with the same index value for different wireless communication devices therein. As such, when a subsequent multi-user packet is received, by such two different wireless communication devices, the very same map index therein may direct each of those two different wireless communication devices to process the multi-user packet differently (e.g., including processing different field(s) within the multi-user packet and/or using different operational parameter(s)).

In this diagram, the map index as extracted from the multi-user packet is handled differently by different wireless communication devices. For example, the management frame map may include different operational parameters or operational information associated with the same index value for each of a number of different wireless communication devices. As such, when the multi-user packet is received, and the map index therein is extracted by the various wireless communication devices, then those different wireless communication devices translate the map index differently using their previously received management frame map. In this diagram, a first field of the multi-user packet is designated for processing by a first of the wireless communication devices in accordance with a first one or more operational parameters (e.g., as directed by the map index, as interpreted using the previously received management frame map). Also, a second field of the multi-user packet is designated for processing by a second of the wireless communication devices in accordance with a second one or more operational parameters (e.g., as directed by the map index, as interpreted using the previously received management frame map).

As can be seen, various portions of a multi-user packet may be processed by different wireless communication devices using different operational parameters using the management frame map and map index functionality and aspects of the invention as presented herein. It is of course noted that when only certain one or more intended portions of the multi-user packet are to be processed by a particular wireless communication device, then the non-intended portions of the multi-user packet may be discarded by other wireless communication devices; in other words, each particular wireless communication device need not process all portions of the multi-user packet, but only those one or more portions intended for that wireless communication device.

FIG. 19A, FIG. 19B, FIG. 20, FIG. 21A, and FIG. 21B are diagrams illustrating various embodiments of methods for operating one or more wireless communication devices.

Figure 19:
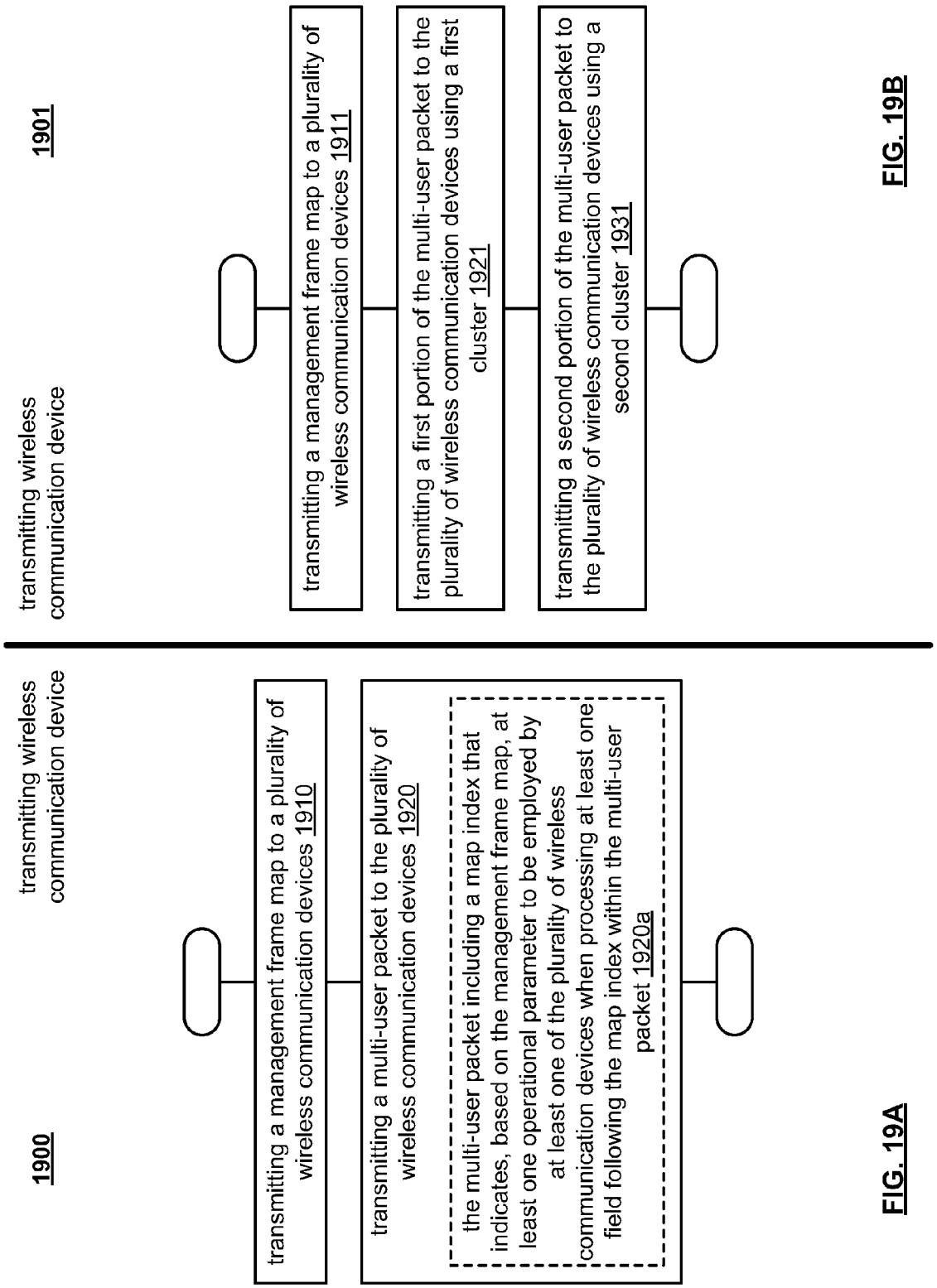
Figure 20:
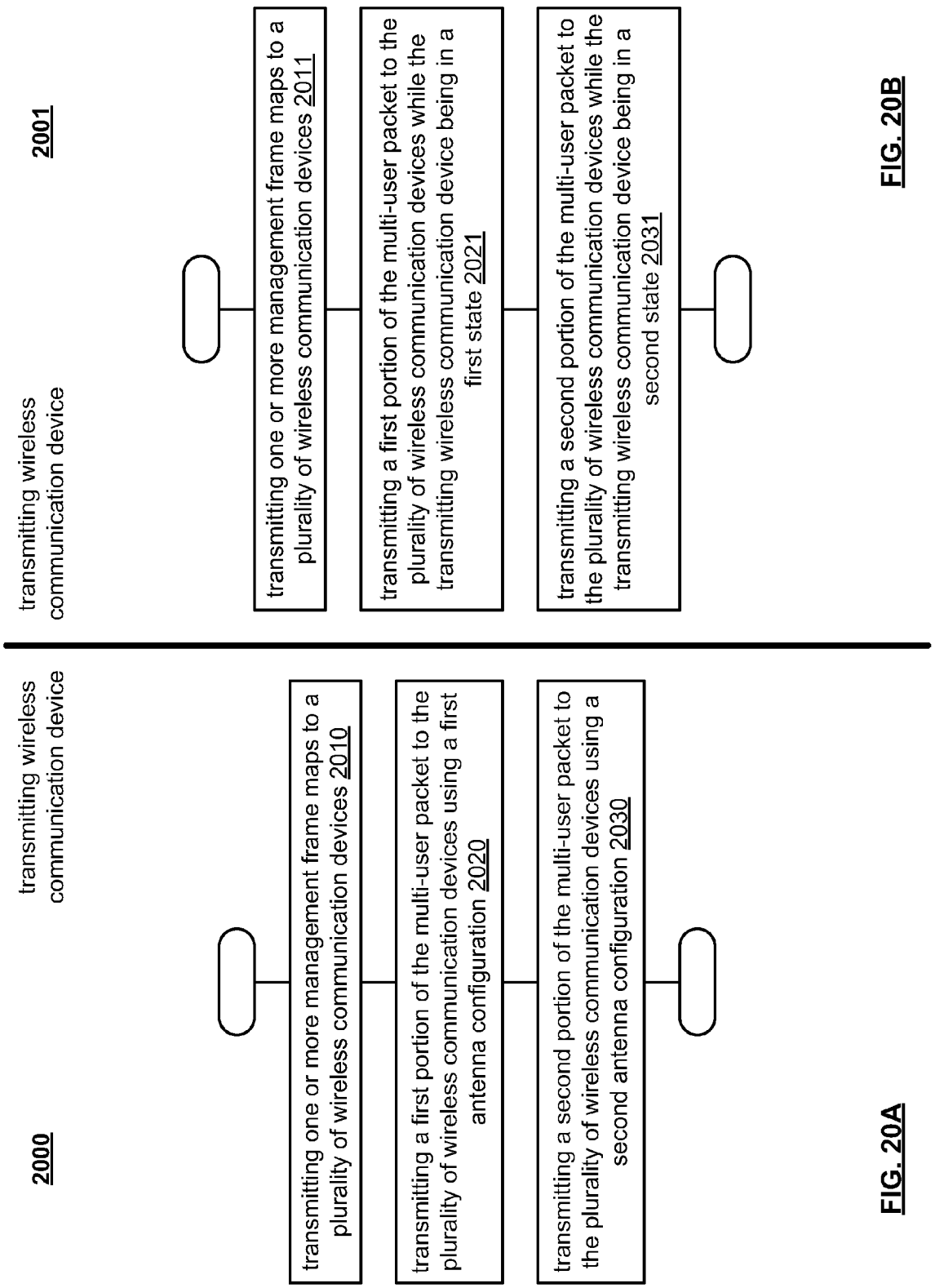

Referring to method 1900 of FIG. 19A, the method 1900 describes operations as may be performed within a transmitting wireless communication device.

The method 1900 begins by transmitting a management frame map to a plurality of wireless communication devices, as shown in a block 1910. The method 1900 then continues by transmitting a multi-user packet to the plurality of wireless communication devices, as shown in a block 1920. Such a multi-user packet, that includes a map index therein, can be operative to indicate, based on the management frame map and interpreted thereby, at least one operational parameter to be employed by at least one of the plurality of wireless communication devices when processing at least one field following the map index within the multi-user packet, as shown in a block 1920a. In some embodiments, different fields within a single multi-user packet may be processed by different wireless communication devices in accordance with different operational parameter(s).

Referring to method 1901 of FIG. 19B, the method 1901 also describes operations as may be performed within a transmitting wireless communication device.

The method 1901 begins by transmitting a management frame map to a plurality of wireless communication devices, as shown in a block 1911. The method 1901 then operates by transmitting a first portion of the multi-user packet to the plurality of wireless communication devices using a first cluster, as shown in a block 1921. The method 1901 continues by transmitting a second portion of the multi-user packet to the plurality of wireless communication devices using a second cluster, as shown in a block 1931. As may be seen, different portions of a multi-user packet need not be transmitted from a transmitting wireless communication device using a same cluster.

Referring to method 2000 of FIG. 20A, the method 2000 also describes operations as may be performed within a transmitting wireless communication device.

The method 2000 begins by transmitting one or more management frame maps to a plurality of wireless communication devices, as shown in a block 2010. The method 2000 then operates by transmitting a first portion of the multi-user packet to the plurality of wireless communication devices using a first antenna configuration, as shown in a block 2020. The method 2000 continues by transmitting a second portion of the multi-user packet to the plurality of wireless communication devices using a second antenna configuration, as shown in a block 2030. As may be seen, different portions of a multi-user packet need not be transmitted from a transmitting wireless communication device while the transmitting wireless communication device remaining continuously in a same antenna configuration.

Referring to method 2001 of FIG. 20B, the method 2001 also describes operations as may be performed within a transmitting wireless communication device.

The method 2001 begins by transmitting one or more management frame maps to a plurality of wireless communication devices, as shown in a block 2011. This diagram shows generally that an operational state of the transmitting wireless communication device may be altered as a function of time when transmitting various portions of the multi-user packet. For example, the method 2001 then operates by transmitting a first portion of the multi-user packet to the plurality of wireless communication devices while the transmitting wireless communication device being in a first state, as shown in a block 2021. The method 2001 continues by transmitting a second portion of the multi-user packet to the plurality of wireless communication devices while the transmitting wireless communication device being in a second state, as shown in a block 2031. Generally speaking, the state of the transmitting wireless communication device may be modified dynamically during the transmission of a multi-user packet to one or more wireless communication devices so that different portions of the multi-user packet are transmitted in accordance with different characteristics.

Figure 21:
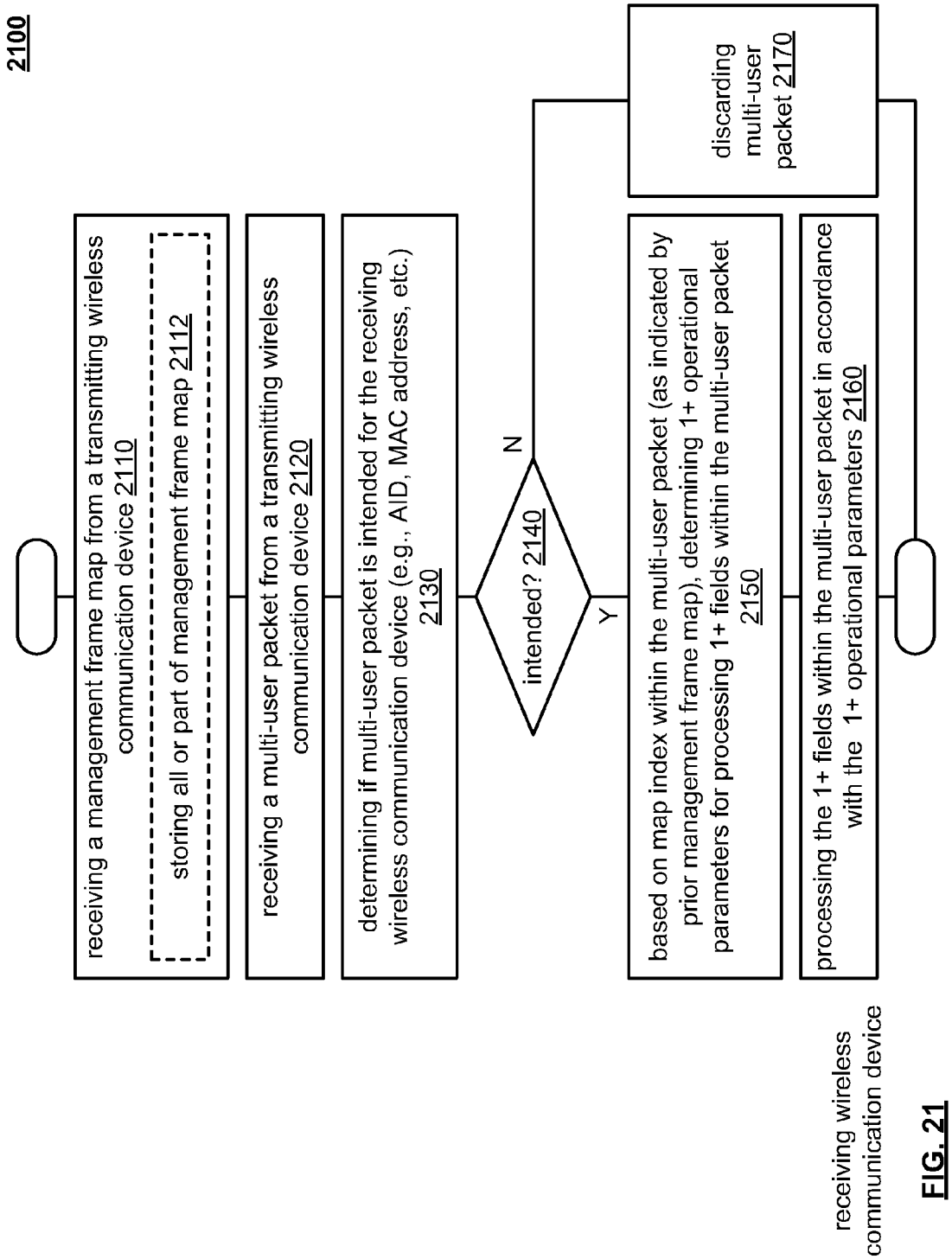

Referring to method 2100 of FIG. 21, the method 2100 describes operations as may be performed within a receiving wireless communication device.

The method 2100 begins by receiving a management frame map from a transmitting wireless communication device, as shown in a block 2110. The method 2100 may also continue by storing all or part of the management frame map, as shown in a block 2112. For example, not all of the portions (e.g., indices) of the management frame map may correspond to all wireless communication devices that receive the management frame map. The method 2100 may operate by storing only those portions of the management frame map that are pertinent and corresponding to that particular wireless communication device.

The method 2100 continues by receiving a multi-user packet from a transmitting wireless communication device, as shown in a block 2120. The method 2100 then operates by determining if multi-user packet is intended for the receiving wireless communication device by comparing map information based on map index corresponding to the receiving wireless communication device information (e.g., AID, MAC address, etc.), as shown in a block 2130.

If it is determined that the multi-user packet is not intended for the receiving wireless communication device, as determined in the decision block 2140, then the method 2100 may operate by discarding the multi-user packet, as shown in a block 2170.

Alternatively, if it is determined that the multi-user packet is intended for the receiving wireless communication device, as determined in the decision block 2140, then the method 2100 may operate by determining one or more operational parameters for processing one or more fields within the multi-user packet based on the map index within the multi-user packet as being interpreted or translated based on the previously received management frame map, as shown in a block 2150. Once this information is determined, the method 2100 continues by actually processing the one or more fields within the multi-user packet in accordance with the determined one or more operational parameters corresponding thereto, as shown in a block 2160.

Referring to method 2200 of FIG. 22A, the method 2200 describes operations as may be performed within a transmitting wireless communication device.

The method 2200 begins by transmitting a first management frame map to a plurality of wireless communication devices, as shown in a block 2210. The method 2200 continues by transmitting one or more multi-user packets to the plurality of wireless communication devices (each multi-user packet including a respective map index as interpreted using the first management frame map), as shown in a block 2220.

The method 2200 then operates by transmitting a second management frame map to the plurality of wireless communication devices, as shown in a block 2230. The method 2200 continues by transmitting one or more multi-user packets to the plurality of wireless communication devices (each multi-user packet including a respective map index as interpreted using the second management frame map), as shown in a block 2240.

Various management frame maps may be transmitted at different times, and a most recently received management frame map may be used to interpret and translate the map indices within following multi-user packets. Then, once another management frame map is received, that management frame map is then used to interpret and translate the map indices within following multi-user packets.

Referring to method 2201 of FIG. 22B, the method 2201 describes operations as may be performed within a receiving wireless communication device.

The method 2201 begins by receiving a first management frame map, as shown in a block 2211. The method 2201 then operates by receiving a first multi-user packet that includes a first map index, as shown in a block 2221. The method 2201 continues by processing at least one portion of the first multi-user packet based on the first map index as interpreted using the first management frame map, as shown in a block 2231.

The method 2201 then operates by receiving a second management frame map, as shown in a block 2241. The method 2201 continues by receiving a second multi-user packet that includes a second map index, as shown in a block 2251. The method 2201 then operates by processing at least one portion of the second multi-user packet based on the second map index as interpreted using the second management frame map, as shown in a block 2261.

As also described within other embodiments, a most recently received management frame map is used to interpret and translate the map indices within multi-user packets that follow the recently received management frame map (e.g., until a next management frame map is received). Of course, when a next management frame map is received, then that management frame map is then used to interpret and translate the map indices within following multi-user packets.

Any of the functionality and/or methods described herein may be implemented and/or performed within a wireless communication device that includes, among other elements/components, a baseband processing module and one or more antennae (e.g., multiple antennae in a preferred embodiment). Such a baseband processing module (e.g., such as in accordance with FIG. 2), may be implemented for generating a management frame map and/or the multi-user packets employed and described herein in accordance with various embodiments.

It is noted that the various modules, circuitries, functional blocks, etc. (e.g., for encoding, for decoding, for baseband processing, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

Mode Selection Tables:

TABLE 1

2.4 GHz, 20/22 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 1 | Barker BPSK | | | | | | | | |
| 2 | Barker QPSK | | | | | | | | |
| 5.5 | CCK | | | | | | | | |
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 11 | CCK | | | | | | | | |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 2

Channelization for Table 1

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 3

Power Spectral Density (PSD) Mask for Table 1
PSD Mask 1

| Frequency Offset | dBr |
|---|---|
| −9 MHz to 9 MHz | 0 |
| +/−11 MHz | −20 |
| +/−20 MHz | −28 |
| +/−30 MHz and greater | −50 |

TABLE 4

5 GHz, 20 MHz channel BW, 54 Mbps max bit rate

| Rate | Modulation | Code Rate | NBPSC | NCBPS | NDBPS | EVM | Sensitivity | ACR | AACR |
|---|---|---|---|---|---|---|---|---|---|
| 6 | BPSK | 0.5 | 1 | 48 | 24 | −5 | −82 | 16 | 32 |
| 9 | BPSK | 0.75 | 1 | 48 | 36 | −8 | −81 | 15 | 31 |
| 12 | QPSK | 0.5 | 2 | 96 | 48 | −10 | −79 | 13 | 29 |
| 18 | QPSK | 0.75 | 2 | 96 | 72 | −13 | −77 | 11 | 27 |
| 24 | 16-QAM | 0.5 | 4 | 192 | 96 | −16 | −74 | 8 | 24 |
| 36 | 16-QAM | 0.75 | 4 | 192 | 144 | −19 | −70 | 4 | 20 |
| 48 | 64-QAM | 0.666 | 6 | 288 | 192 | −22 | −66 | 0 | 16 |
| 54 | 64-QAM | 0.75 | 6 | 288 | 216 | −25 | −65 | −1 | 15 |

TABLE 5

Channelization for Table 4

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |

TABLE 5-continued

Channelization for Table 4

| Channel | Frequency (MHz) | Country | Channel | Frequency (MHz) | Country |
|---|---|---|---|---|---|
| 161 | 5805 | USA | | | |
| 165 | 5825 | USA | | | |

TABLE 6

2.4 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 7

Channelization for Table 6

| Channel | Frequency (MHz) |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |

TABLE 8

5 GHz, 20 MHz channel BW, 192 Mbps max bit rate

| Rate | TX Antennas | ST Code Rate | Modulation | Code Rate | NBPSC | NCBPS | NDBPS |
|---|---|---|---|---|---|---|---|
| 12 | 2 | 1 | BPSK | 0.5 | 1 | 48 | 24 |
| 24 | 2 | 1 | QPSK | 0.5 | 2 | 96 | 48 |
| 48 | 2 | 1 | 16-QAM | 0.5 | 4 | 192 | 96 |
| 96 | 2 | 1 | 64-QAM | 0.666 | 6 | 288 | 192 |
| 108 | 2 | 1 | 64-QAM | 0.75 | 6 | 288 | 216 |
| 18 | 3 | 1 | BPSK | 0.5 | 1 | 48 | 24 |
| 36 | 3 | 1 | QPSK | 0.5 | 2 | 96 | 48 |
| 72 | 3 | 1 | 16-QAM | 0.5 | 4 | 192 | 96 |
| 144 | 3 | 1 | 64-QAM | 0.666 | 6 | 288 | 192 |
| 162 | 3 | 1 | 64-QAM | 0.75 | 6 | 288 | 216 |
| 24 | 4 | 1 | BPSK | 0.5 | 1 | 48 | 24 |
| 48 | 4 | 1 | QPSK | 0.5 | 2 | 96 | 48 |
| 96 | 4 | 1 | 16-QAM | 0.5 | 4 | 192 | 96 |
| 192 | 4 | 1 | 64-QAM | 0.666 | 6 | 288 | 192 |
| 216 | 4 | 1 | 64-QAM | 0.75 | 6 | 288 | 216 |

TABLE 9 channelization for Table 8

| Channel | Frequency (MHz) | Country | Channel | Frequency (MHz) | Country |
|---|---|---|---|---|---|
| 240 | 4920 | Japan | | | |
| 244 | 4940 | Japan | | | |
| 248 | 4960 | Japan | | | |
| 252 | 4980 | Japan | | | |
| 8 | 5040 | Japan | | | |
| 12 | 5060 | Japan | | | |
| 16 | 5080 | Japan | | | |
| 36 | 5180 | USA/Europe | 34 | 5170 | Japan |
| 40 | 5200 | USA/Europe | 38 | 5190 | Japan |
| 44 | 5220 | USA/Europe | 42 | 5210 | Japan |
| 48 | 5240 | USA/Europe | 46 | 5230 | Japan |
| 52 | 5260 | USA/Europe | | | |
| 56 | 5280 | USA/Europe | | | |
| 60 | 5300 | USA/Europe | | | |
| 64 | 5320 | USA/Europe | | | |
| 100 | 5500 | USA/Europe | | | |
| 104 | 5520 | USA/Europe | | | |
| 108 | 5540 | USA/Europe | | | |
| 112 | 5560 | USA/Europe | | | |
| 116 | 5580 | USA/Europe | | | |
| 120 | 5600 | USA/Europe | | | |
| 124 | 5620 | USA/Europe | | | |
| 128 | 5640 | USA/Europe | | | |
| 132 | 5660 | USA/Europe | | | |
| 136 | 5680 | USA/Europe | | | |
| 140 | 5700 | USA/Europe | | | |
| 149 | 5745 | USA | | | |
| 153 | 5765 | USA | | | |
| 157 | 5785 | USA | | | |
| 161 | 5805 | USA | | | |
| 165 | 5825 | USA | | | |

TABLE 10

5 GHz, with 40 MHz channels and max bit rate of 486 Mbps

| Rate | TX Antennas | ST Code Rate | Modulation | Code Rate | NBPSC |
|---|---|---|---|---|---|
| 13.5 Mbps | 1 | 1 | BPSK | 0.5 | 1 |
| 27 Mbps | 1 | 1 | QPSK | 0.5 | 2 |
| 54 Mbps | 1 | 1 | 16-QAM | 0.5 | 4 |
| 108 Mbps | 1 | 1 | 64-QAM | 0.666 | 6 |
| 121.5 Mbps | 1 | 1 | 64-QAM | 0.75 | 6 |
| 27 Mbps | 2 | 1 | BPSK | 0.5 | 1 |
| 54 Mbps | 2 | 1 | QPSK | 0.5 | 2 |
| 108 Mbps | 2 | 1 | 16-QAM | 0.5 | 4 |
| 216 Mbps | 2 | 1 | 64-QAM | 0.666 | 6 |
| 243 Mbps | 2 | 1 | 64-QAM | 0.75 | 6 |
| 40.5 Mbps | 3 | 1 | BPSK | 0.5 | 1 |
| 81 Mbps | 3 | 1 | QPSK | 0.5 | 2 |
| 162 Mbps | 3 | 1 | 16-QAM | 0.5 | 4 |
| 324 Mbps | 3 | 1 | 64-QAM | 0.666 | 6 |
| 365.5 Mbps | 3 | 1 | 64-QAM | 0.75 | 6 |
| 54 Mbps | 4 | 1 | BPSK | 0.5 | 1 |
| 108 Mbps | 4 | 1 | QPSK | 0.5 | 2 |
| 216 Mbps | 4 | 1 | 16-QAM | 0.5 | 4 |

TABLE 10-continued

5 GHz, with 40 MHz channels and max bit rate of 486 Mbps

| Rate | TX Antennas | ST Code Rate | Modulation | Code Rate | NBPSC |
|---|---|---|---|---|---|
| 432 Mbps | 4 | 1 | 64-QAM | 0.666 | 6 |
| 486 Mbps | 4 | 1 | 64-QAM | 0.75 | 6 |

TABLE 11

Power Spectral Density (PSD) mask for Table 10
PSD Mask 2

| Frequency Offset | dBr |
|---|---|
| −19 MHz to 19 MHz | 0 |
| +/−21 MHz | −20 |
| +/−30 MHz | −28 |
| +/−40 MHz and greater | −50 |

TABLE 12

Channelization for Table 10

| Channel | Frequency (MHz) | Country | Channel | Frequency (MHz) | County |
|---|---|---|---|---|---|
| 242 | 4930 | Japan | | | |
| 250 | 4970 | Japan | | | |
| 12 | 5060 | Japan | | | |
| 38 | 5190 | USA/Europe | 36 | 5180 | Japan |
| 46 | 5230 | USA/Europe | 44 | 5520 | Japan |
| 54 | 5270 | USA/Europe | | | |
| 62 | 5310 | USA/Europe | | | |
| 102 | 5510 | USA/Europe | | | |
| 110 | 5550 | USA/Europe | | | |
| 118 | 5590 | USA/Europe | | | |
| 126 | 5630 | USA/Europe | | | |
| 134 | 5670 | USA/Europe | | | |
| 151 | 5755 | USA | | | |
| 159 | 5795 | USA | | | |

What is claimed is:

1. A method for operating a wireless communication device, the method comprising:
transmitting a management frame map to a plurality of other wireless communication devices, the management frame map including operational parameters for a first and a second of the plurality of the other wireless communication devices, the operational parameters associated with a map index, wherein at least one of first operational parameters for the first wireless communication device of the other wireless communication devices are different than at least one of second operational parameters for the second wireless communication device of the other wireless communication devices;
transmitting a multi-user packet to the plurality of other wireless communication devices of at least one of a plurality of clusters, the at least one cluster based on a tone mapping among one or more channels of one or more frequency bands, wherein the multi-user packet including the map index indicating, based on the management frame map, the at least one of the first operational parameters determined to be relevant to the first of the plurality of other wireless communication devices, and when relevant, the first of the plurality of other wireless communication devices employs the at least one of the first operational parameters to process at least one field of a subsequent multi-user packet based on the map index within the multi-user packet; and
the map index further indicating:
the at least one of the second operational parameters determined to be relevant to the second of the plurality of other wireless communication devices, and when relevant, the second of the plurality of other wireless communication devices employs the at least one of the second operational parameters to process at least another field based on the map index within the multi-user packet.

2. The method of claim 1, wherein:
the multi-user packet being a multiple input multiple output (MU-MIMO) packet or an orthogonal frequency division multiple access (OFDMA) packet.

3. The method of claim 1, wherein:
the map index indicating the multi-user packet being intended only for a subset of the plurality of other wireless communication devices; and
the multi-user packet being discarded by those of the plurality of other wireless communication devices not being within the subset of the plurality of other wireless communication devices.

4. The method of claim 1, further comprising, operating another one of the plurality of other wireless communication devices for:
receiving the multi-user packet including the map index;
processing a header of the multi-user packet in accordance with the at least one of the first operational parameters, wherein the header including the map index; and
processing a data field of the multi-user packet in accordance with the at least one of the second operational parameters, wherein the data field following the map index within the multi-user packet.

5. The method of claim 1, wherein:
the at least one field following the map index within the multi-user packet being a data field including information bits intended for at least one of the plurality of other wireless communication devices.

6. The method of claim 1, wherein the operational parameters each comprising at least one of:
a cluster on which the at least one field following the map index within the multi-user packet being transmitted;
a modulation coding scheme (MCS);
a forward error correction (FEC) coding scheme;
space time block coding (STBC); and
an antenna configuration of a plurality of antennae within the wireless communication device.

7. The method of claim 1, wherein:
the operational parameters being a cluster on which the at least one field following the map index within the multi-user packet being transmitted; and
the cluster being composed of at least one channel within at least one band.

8. The method of claim 1, wherein:
the at least one of the first operational parameters being a first cluster on which the at least one field following the map index within the multi-user packet being transmitted; and
the at least one of the second operational parameters being a second cluster on which at least one additional field following the map index within the multi-user packet being transmitted.

9. The method of claim 8, wherein:
the first cluster being composed of at least one channel within a first band; and the second cluster being composed of at least one channel within a second band.

10. The method of claim 8, wherein:
the first cluster being composed of a first plurality of channels among a first band and a second band; and
the second cluster being composed of a second plurality of channels among a third band and a fourth band.

11. The method of claim 1, wherein:
the wireless communication device being an access point (AP); and
the plurality of other wireless communication devices being a plurality of wireless stations (STAs).

12. A method for operating a wireless communication device, the method comprising:
transmitting at least one management frame map to a plurality of other wireless communication devices, the at least one management frame map including operational parameters for at least a first and a second of the plurality of other wireless communication devices and the operational parameters associated with a map index, wherein one or more first operational parameters for the first wireless communication device are different than one or more second operational parameters for the second wireless communication device; and
transmitting a multi-user packet to the plurality of other wireless communication devices, wherein the first multi-user packet including the map index indicating, based on the at least one management frame map:
the one or more first operational parameters determined to be relevant to at least the first of the plurality of other wireless communication devices, and when relevant, the first of the plurality of other wireless communication devices employs the one or more first operational parameters to process a first field based on the map index within the first multi-user packet; and
the map index further indicating:
the one or more second operational parameters determined to be relevant to at least the second of the plurality of other wireless communication devices, and when relevant, the second of the plurality of other wireless communication devices employs the one or more second operational parameters to process a second field based on the map index within a second multi-user packet.

13. The method of claim 12, wherein:
the multi-user packet being a multiple input multiple output (MU-MIMO) packet or an orthogonal frequency division multiple access (OFDMA) packet.

14. The method of claim 12, wherein:
the first field following the map index within the first multi-user packet being a first data field including information bits intended for the first of the plurality of other wireless communication devices; and
the second field following the map index within the second multi-user packet being a second data field including information bits intended for the second of the plurality of other wireless communication devices.

15. The method of claim 12, wherein the one or more of first operational parameters and the one or more of the second operational parameters each comprising at least one of:
a cluster on which the first field or the second field following the map index within the first or second multi-user packet being transmitted;
a modulation coding scheme (MCS);
a forward error correction (FEC) coding scheme;
space time block coding (STBC); and
an antenna configuration of a plurality of antennae within the wireless communication device.

16. The method of claim 12, wherein:
the the one or more of the first operational parameters being a first cluster on which the first field following the map index within the first multi-user packet being transmitted;
the one or more of the second operational parameters being a second cluster on which the second field following the map index within the second multi-user packet being transmitted; and
at least one of the first cluster and the second cluster being composed of at least one channel within at least one band.

17. The method of claim 12, wherein:
the wireless communication device being an access point (AP); and
the plurality of other wireless communication devices being a plurality of wireless stations (STAs).

18. An apparatus, comprising:
a baseband processing module for generating a management frame map and a multi-user packet;
at least one antenna for transmitting:
the management frame map to a plurality of other wireless communication devices associated with a cluster based on a tone mapping among one or more channels of one or more frequency bands, the management frame map including operational parameters for a first and a second of the other wireless communication devices, the operational parameters associated with a map index, wherein at least one of first operational parameters for the first wireless communication device of the plurality of other wireless communication devices are different than at least one of second operational parameters for the second wireless communication device of the plurality of other wireless communication devices; and
the multi-user packet to the plurality of other wireless communication devices; and wherein:
the multi-user packet including the map index indicating, based on the management frame map, the at least one of the first operational parameters determined to be relevant to the first of the plurality of other wireless communication devices, and when relevant, the first of the plurality of other wireless communication devices employs the at least one of the first operational parameters to process at least one field of a subsequent multi-user packet based on the map index within the multi-user packet; and
the map index further indicating:
the at least one of the second operational parameters determined to be relevant to the second of the plurality of other wireless communication devices, and when relevant, the second of the plurality of other wireless communication devices employs the at least one of the second operational parameters to process at least another field based on the map index within the multi-user packet.

19. The apparatus of claim 18, wherein:
the multi-user packet being a multiple input multiple output (MU-MIMO) packet or an orthogonal frequency division multiple access (OFDMA) packet.

20. The apparatus of claim 18, wherein:
the map index indicating the multi-user packet being intended only for a subset of the plurality of other wireless communication devices; and the multi-user packet being discarded by those of the plurality of other wireless communication devices not being within the subset of the plurality of other wireless communication devices.

21. The apparatus of claim 18, wherein, another one of the plurality of other wireless communication devices:
receiving the multi-user packet including the map index;
processing a header of the multi-user packet in accordance with a first of the plurality of operational parameters, wherein the header including the map index; and
processing a data field of the multi-user packet in accordance with the at lease one of the second operational parameters, wherein the data field following the map index within the multi-user packet.

22. The apparatus of claim 18, wherein:
the at least one field following the map index within the multi-user packet being a data field including information bits intended for at least one of the plurality of other wireless communication devices.

23. The apparatus of claim 18, wherein the at least one of the first and the second operational parameters each comprising at least one of:
a cluster on which the at least one field following the map index within the multi-user packet being transmitted;
a modulation coding scheme (MCS);
a forward error correction (FEC) coding scheme;
space time block coding (STBC); and
an antenna configuration of the at least one antenna and at least one additional antenna, also within the apparatus, for transmitting the management frame map and the multi-user packet.

24. The apparatus of claim 18, wherein:
the at least one of the operational parameters being a cluster on which the at least one field following the map index within the multi-user packet being transmitted; and
the cluster being composed of at least one channel within at least one band.

25. The apparatus of claim 18, wherein:
the at least one of the first operational parameters being a first cluster on which the at least one field following the map index within the multi-user packet being transmitted; and
the at least one of the second operational parameters being a second cluster on which at least one additional field following the map index within the multi-user packet being transmitted.

26. The apparatus of claim 25, wherein:
the first cluster being composed of at least one channel within a first band; and
the second cluster being composed of at least one channel within a second band.

27. The apparatus of claim 25, wherein:
the first cluster being composed of a first plurality of channels among a first band and a second band; and
the second cluster being composed of a second plurality of channels among a third band and a fourth band.

28. The apparatus of claim 18, wherein:
the apparatus being an access point (AP); and
the plurality of other wireless communication devices being a plurality of wireless stations (STAs).

* * * * *